(12) United States Patent
Cevik et al.

(10) Patent No.: US 12,424,394 B2
(45) Date of Patent: Sep. 23, 2025

(54) HYDROGEL ELECTROLYTE FOR A SUPERCAPACITOR

(71) Applicant: Imam Abdulrahman Bin Faisal University, Dammam (SA)

(72) Inventors: Emre Cevik, Dammam (SA); Ayhan Bozkurt, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 647 days.

(21) Appl. No.: 17/879,457

(22) Filed: Aug. 2, 2022

(65) Prior Publication Data
US 2024/0047147 A1   Feb. 8, 2024

(51) Int. Cl.
  H01G 11/56   (2013.01)
  H01G 11/34   (2013.01)
  H01G 11/36   (2013.01)
  H01G 11/42   (2013.01)

(52) U.S. Cl.
  CPC ............ H01G 11/56 (2013.01); H01G 11/34 (2013.01); H01G 11/42 (2013.01); *H01G 11/36* (2013.01)

(58) Field of Classification Search
None
See application file for complete search history.

(56) References Cited

U.S. PATENT DOCUMENTS

2015/0041730 A1   2/2015   Kangas et al.

FOREIGN PATENT DOCUMENTS

| CN | 106531454 A | 3/2017 |
|---|---|---|
| CN | 110034341 A | 7/2019 |
| CN | 112863892 A | 5/2021 |
| CN | 112038635 B | 12/2021 |

OTHER PUBLICATIONS

Yan, et al. ; Biomass-Derived Activated Carbon Nanoarchitectonics with Hibiscus Flowers for High-Performance Supercapacitor Electrode Applications ; Chemical Engineering & Technology, vol. 45, Issue 4 ; pp. 649-657 ; Abstract Only ; 1 Page.

Rani, et al. ; A comprehensive investigation on electrical characterization and ionic transport properties of cellulose derivative from kenaf fibre-based biopolymer electrolytes ; Polym. Bull. ; Mar. 16, 2018 ; 15 Pages.

*Primary Examiner* — C Melissa Koslow
(74) *Attorney, Agent, or Firm* — Oblon, McClelland, Maier & Neustadt, L.L.P.

(57) ABSTRACT

A hydrogel electrolyte for a supercapacitor includes sodium carboxymethyl cellulose (C), water, citric acid (CA); and an aqueous extract of *Hibiscus sabdariffa*. The sodium carboxymethyl cellulose (C) and the citric acid (CA) form a citric acid cross-linked cellulose-based polymer hydrogel (C-CA-C). An organic acid from the aqueous extract of *Hibiscus sabdariffa* is intercalated to the citric acid cross-linked cellulose-based polymer hydrogel (C-CA-C) via hydrogen bonds. A method of preparation of the hydrogel electrolyte is also discussed.

20 Claims, 25 Drawing Sheets

HYDROGEL ELECTROLYTE FOR A SUPERCAPACITOR

BACKGROUND

Technical Field

The present disclosure is directed to a supercapacitor, particularly to the supercapacitor made of a hydrogel electrolyte and a method of preparation thereof.

Description of Related Art

The "background" description provided herein is to generally present the context of the disclosure. Work of the presently named inventors, to the extent it is described in this background section, as well as aspects of the description that may not otherwise qualify as prior art at the time of filing, are neither expressly nor impliedly admitted as prior art against the present invention.

Energy crisis and environmental challenges, combined with increasing social and economic development has made it critical to develop environmentally benign and low-cost energy sources. Owing to the increase in demand for power and energy, renewable energy sources have sparked a lot of interest in developing high-performance energy storage technologies.

Supercapacitors, among many other electrical energy storage devices, have attracted researchers because of their unique characteristics such as low-cost, outstanding cycle stability, superhigh rate capability, fast charge-discharge rates, and high-power densities.

Electrolytes play a significant role in electric double-layer capacitor (EDLC) systems, as the electrolyte used between the electrodes determines the physical and electrochemical qualities as well as the energy density. Electrochemical stability features and ionic conductivity for the electrolytes, on the other hand, are crucial aspects of research.

The green synthesis of environmentally friendly and non-toxic gel electrolytes has recently become an essential technique to overcome environmental issues and thus, manufacturing low-cost/high-performance supercapacitors. In the green synthesis of electrolytes, biomass as a natural and renewable source has been used as a precursor to producing gel-electrolyte composites. The specific capacity, energy, specific power, and cycle life of biomass-derived systems could be improved. Among the natural sources, the dark red H flowers, which belong mainly to the Roselle (*Hibiscus sabdariffa*) family, are essentially composed of organic and phenolic acids (hydroxycitric acid, citric acid, and *hibiscus* acid). Citric acid, a class of organic components belonged to the family of carboxylic acids. Due to its complexing property, it could avoid the formation of insoluble precipitates in the electrolyte solution and on the electrode surface. A printable gel polymer electrolyte was prepared with different concentrations of citric acid which provided ionic conductivity (2.30±0.07) milliSiemens per centimeter (mS cm$^{-1}$), while the specific capacitance of the printed supercapacitor reached 54 F g$^{-1}$.

However, organic acids, phenolic, anthocyanins, and antioxidant chemicals are excellent sources of carbon that can be integrated into a metal oxide composite to create long-lasting and environmentally acceptable metal oxide/carbon matrix-based electrode materials. The conductivity and cyclic stability of metal oxides can be enhanced by this inclusion. The development of metal oxides on carbon-based composites (MxOy@C) was produced from natural resources. Nevertheless, gel polymer electrolytes (GPEs), which were prepared by aggregating a huge number of liquid electrolytes into a polymer framework, including both liquid and solid electrolyte features, are gaining wide attention due to their high ionic conductivity (above 10$^{-4}$ S cm$^{-1}$ at room temperature), broad electrochemical window, high thermal stability, and compatibility with cathode and anode during a cycling process. Compared to natural polymers, synthetic polymers including polyvinyl alcohol (PVA), polyethylene oxide (PEO), and polyacrylonitrile have been frequently used as host polymers, although they were more expensive, depleting petroleum resources, and causing environmental issues.

Bio-polymer components have recently received immense attention because they are abundant in nature and are more environmentally friendly. They are key components in tackling a range of global challenges, such as global warming, price volatility, petroleum resource scarcity, pollution, and other economic and ecological issues. In general, bio-based polymers are referred to as a type of polymer produced spontaneously by living organisms. In comparison to liquid electrolytes, bio-based polymers, like typical petrochemical-based polymer electrolytes, have lower ionic conductivity. To solve low ionic conductivity, a variety of fillers, plasticizers, and polymer blending techniques were studied. Many materials such as cellulose, chitosan, and carboxymethyl cellulose (C) have all been proved to be effective as polymer hosts. C has shown a promising ability as a polymer host for proton-conducting biopolymer electrolytes. C may be the most robust among all cellulose derivatives and has hydrophilic carboxyl groups with a water-soluble backbone. Additionally, C is a biodegradable environmentally friendly, low-cost, and semi-crystalline substance with outstanding film-forming capabilities. Since C is available to prepare a thin film and potential conduction qualities, numerous studies have been conducted to produce C for application in electrolyte systems. Furthermore, a C molecule has movable positive charge carriers and fixed negative charge carriers, and C could create a compound with some salts, resulting in the enhancement of ionic conductivity. Moreover, cellulose-based materials have long been used as mechanical reinforcement and stability support. Several carboxymethyl cellulose sodium salt-based hydrogels and pastes were synthesized and analyzed for solid supercapacitors. The specific capacitance observed using optimized hydrogel was 81.5 and 76.8 F g$^{-1}$ using cyclic voltammetry (CV) and galvanostatic charge-discharge (GCD) measurements, respectively, which decreased to 60.7 F g$^{-1}$ and 75.5 F g$^{-1}$ with paste.

Since many types of electrolytes show several drawbacks such as high toxicity, leakage, high cost, and flammability. Therefore, there is an unmet need for electrolytes with better stability and features.

In view of the forgoing, one objective of the present disclosure is to provide a hydrogel electrolyte having an aqueous extract of *Hibiscus sabdariffa* intercalated to a citric acid cross-linked cellulose-based polymer, and a method for making thereof. The hydrogel electrolyte may be used in a supercapacitor.

SUMMARY

In an exemplary embodiment, a hydrogel electrolyte for a supercapacitor is described. The hydrogel electrolyte for the supercapacitor includes sodium carboxymethyl cellulose (C), water; citric acid (CA), and an aqueous extract of *Hibiscus sabdariffa*. The sodium carboxymethyl cellulose (C) and the citric acid (CA) form a citric acid cross-linked cellulose-based polymer hydrogel (C-CA-C). An organic acid from the aqueous extract of *Hibiscus sabdariffa* is intercalated to the citric acid cross-linked cellulose-based polymer hydrogel (C-CA-C) via hydrogen bonds.

In some embodiments, the hydrogel electrolyte includes the organic acid, which is at least one selected from a group consisting of phenolic acid, hydroxycitric acid, *hibiscus* acid, tartaric acid, malic acid, and ascorbic acid.

In some embodiments, the hydrogel electrolyte includes the sodium carboxymethyl cellulose and citric acid having a weight ratio of 1:4 to 4:1.

In some embodiments, the hydrogel electrolyte includes the hydrogel with 50 to 99 weights percent (wt. %) of water relative to the total weight of the hydrogel.

In some embodiments, the hydrogel electrolyte has a weight loss of less than 10% when heated to a temperature of up to 200 degrees centigrade (° C.) for at least 15 minutes.

In some embodiments, the hydrogel electrolyte has an ion conductivity of 0.005 to 0.05 siemens per centimeter (S cm$^{-1}$) at 20 to 30° C.

In some embodiments, the hydrogel electrolyte includes the aqueous extract of *Hibiscus sabdariffa* which is made by contacting *Hibiscus sabdariffa* with water at a mass ratio of the *Hibiscus sabdariffa* to the water of 1:25 to 5:25.

In some embodiments, the contacting of the hydrogel electrolyte is done for 12 to 96 hours at 20 to 30° C.

In some embodiments, the hydrogel electrolyte includes a *Hibiscus sabdariffa* which is ground, blended, or cut.

In some embodiments, the hydrogel electrolyte includes the *Hibiscus sabdariffa* which is a flower of *Hibiscus sabdariffa*.

In some embodiments, a method of making the hydrogel electrolyte includes mixing sodium carboxymethyl cellulose powder and water to form a first mixture, mixing a citric acid with the first mixture to form a second mixture, and mixing the aqueous extract of *Hibiscus sabdariffa* with the second mixture to form the hydrogel electrolyte.

In some embodiments, the supercapacitor includes an anode, a cathode, and the hydrogel electrolyte. The anode and the cathode have a surface of a conductive carbonaceous material in contact with the hydrogel electrolyte.

In some embodiments, the supercapacitor includes the conductive carbonaceous material which is at least one selected from a group consisting of graphite, activated carbon, reduced graphene oxide, carbon nanotubes, carbon nanofibers, and carbon black.

In some embodiments, the supercapacitor has a power density of 200 to 500 watts per kilogram (W/kg).

In some embodiments, the supercapacitor has an energy density of 50 to 120 watt-hour per kilogram (W h/kg).

In some embodiments, the supercapacitor includes at least 90% of the initial specific capacitance which is maintained after 90,000 to 12,000 charge-discharge cycles.

In some embodiments, the supercapacitor has a specific capacitance of 380 to 500 farad per gram (F/g) at 0.2 to 0.8 milliamperes (mA).

In some embodiments, the supercapacitor has an equivalent series resistance of 3 to 11 Ohm.

In some embodiments, a supercapacitor assembly includes 2 to 10 of the supercapacitors connected in parallel and/or in series.

In some embodiments, a light-emitting diode device includes the supercapacitor which is electrically connected to the light-emitting diode; and the supercapacitor functions like a battery.

The foregoing general description of the illustrative present disclosure and the following The detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
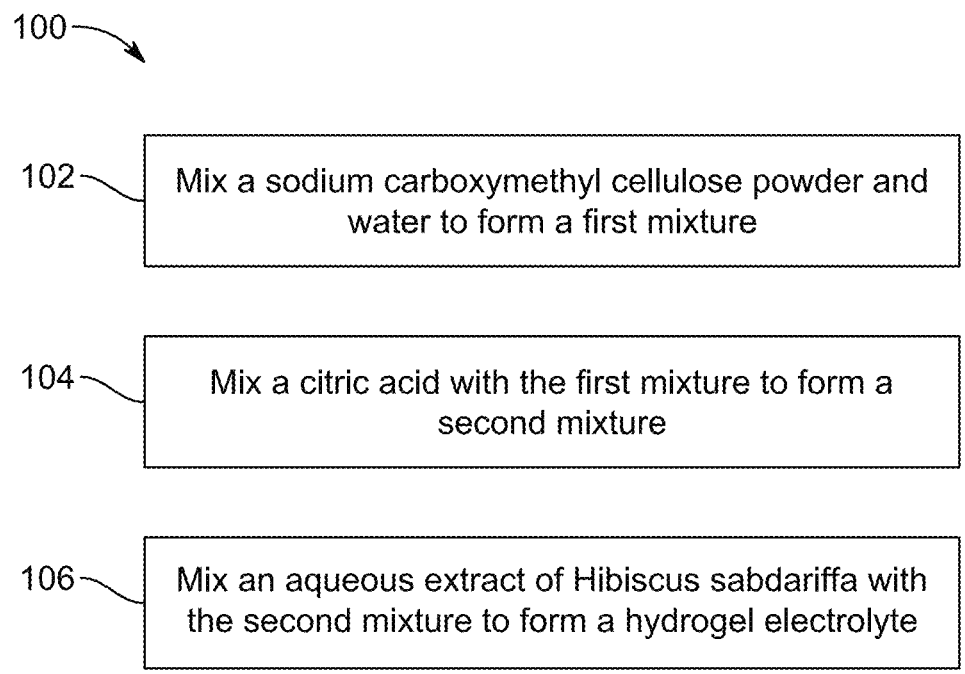
FIG. 1 is a schematic flow diagram of a method for making a hydrogel electrolyte, according to certain embodiments.

In the drawings, reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "hydrogel" refers to a three-dimensional (3D) network of hydrophilic polymers that can swell in water and hold a large amount of water while maintaining the structure due to chemical or physical cross-linking of individual polymer chains.

As used herein, the term "extract" refers to a compound separated from a composition by an extraction process. An extract may also refer to the mixture of both the extracting gas, liquid, and/or supercritical fluid and the extracted compound. In other cases, an "extract" may refer to only an extracted compound or compounds. Furthermore, an extract may be diluted, concentrated, purified, dried, or reconstituted and still be referred to as an "extract."

As used herein, the term "electrolyte" refers to minerals in your blood and other body fluids that carry an electric charge.

As used herein, the term "supercapacitor" refers to an electrochemical energy storage device that stores and releases energy by reversible adsorption and desorption of ions at the interfaces between electrode materials and electrolytes.

According to a first aspect, the present disclosure relates to a hydrogel electrolyte, which includes an aqueous extract of *Hibiscus sabdariffa* intercalated to a citric acid cross-linked cellulose-based polymer hydrogel.

In an embodiment, the hydrogel electrolyte for a supercapacitor includes sodium carboxymethyl cellulose (C); water; citric acid (CA); and an aqueous extract of *Hibiscus sabdariffa*.

In an embodiment, the sodium carboxymethyl cellulose (C) and the citric acid (CA) form a citric acid crosslinked cellulose-based polymer hydrogel (C-CA-C).

In an embodiment, an organic acid from the aqueous extract of *Hibiscus sabdariffa* is intercalated to the citric acid crosslinked cellulose-based polymer hydrogel (C-CA-C) via hydrogen bonds.

In some embodiments, the hydrogel electrolyte includes an organic acid which is at least one selected from a group consisting of phenolic acid, hydroxycitric acid, *hibiscus* acid, tartaric acid, malic acid, and ascorbic acid.

In some embodiments, the sodium carboxymethyl cellulose and citric acid have a weight ratio of 1:10 to 10:1, preferably 1:8 to 8:1, preferably 1:6 to 6:1, preferably 1:4 to 4:1.

In some embodiments, the hydrogel electrolyte includes 30 to 99 wt. %, preferably 40 to 99 wt. %, preferably 50 to 99 wt. % of water relative to the total weight of the hydrogel.

In some embodiments, the hydrogel electrolyte has a weight loss of less than 5 to 20%, preferably 7 to 15%, preferably 10% when heated to a temperature of up to 100 to 400° C., preferably 150 to 300° C., preferably 150 to 250° C., preferably 200° C. for at least 5 to 60 minutes, preferably 10 to 40 minutes, preferably 10 to 30 minutes, preferably 15 minutes.

In some embodiments, the hydrogel electrolyte has an ion conductivity of 0.003 to 0.1 siemens per centimeter (S cm$^{-1}$), preferably 0.004 to 0.08 S cm$^{-1}$, preferably 0.005 to 0.05 S cm$^{-1}$ at 10 to 40° C., preferably 15 to 35° C., preferably 20 to 30° C.

In some embodiments, the aqueous extract of *Hibiscus sabdariffa* is made by contacting *Hibiscus sabdariffa* with water at a mass ratio of the *Hibiscus sabdariffa* to the water of 1:40 to 1:10, preferably 1:30 to 1:20, preferably 1:25 to 1:10, preferably 1:25 to 1:5.

In some embodiments, the contacting is done for 5 to 140 hours, preferably 5 to 120 hours, preferably 5 to 100 hours, preferably 7 to 99 hours, preferably 12 to 96 hours at 10 to 40° C., preferably 15 to 35° C., preferably 20 to 30° C.

In some embodiments, the *Hibiscus sabdariffa* is a flower of *Hibiscus sabdariffa*.

In some embodiments, *Hibiscus sabdariffa* is ground, blended, or cut.

In an embodiment, a reddish polymer hydrogel electrolyte is dried at 30 to 100° C., preferably 40 to 80° C., preferably 60° C. under a vacuum for 1 to 10 hours, preferably 2 to 8 hours, preferably 4 hours to produce a film.

According to a second aspect, the present disclosure relates a method for making the hydrogel electrolyte of the first aspect.

Referring to FIG. 1, a schematic flow diagram of a method 100 for forming the hydrogel electrolyte is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes mixing sodium carboxymethyl cellulose powder (C) and water to form a first mixture. In one embodiment, the sodium carboxymethyl cellulose powder (C) and water have a mass ratio of 1:90 to 2:87, preferably 1:85 to 4:75, preferably 1:70 to 4:74, preferably 1:40 and mixed at 15 to 40° C., preferably 20 to 30° C. until dissolved homogeneously. After dissolution, 5 to 20 wt %, preferably 10 wt % based on the total weight of 2 to 10%, preferably 3 to 8%, preferably 5% citric acid (CA) solution is added and homogenized for 1 to 60 minutes, preferably 2 to 40 minutes, preferably 20 minutes.

At step 104, the method 100 includes mixing a citric acid (CA) with the first mixture to form a second mixture. In some embodiments, different amounts of H were weighed and mixed with DI water at 15 to 40° C., preferably 20 to 30° C.

At step 106, the method 100 includes mixing the aqueous extract of *Hibiscus sabdariffa* (H) with the second mixture to form the hydrogel electrolyte.

*Hibiscus sabdariffa* may be extracted into water, and/or one or more organic solvents such as methanol, ethanol, acetone, hexane, isopropanol, n-propanol, sec-butanol, n-butanol, isobutanol, tert-butanol, glycerol, diethyl ether, ethylene glycol, propylene glycol, polyethylene glycol, carbon tetrachloride, chloroform, or tetrachloroethylene. The water may be tap water, distilled water, bidistilled water, deionized water, deionized distilled water, reverse osmosis water, and/or some other water. In one embodiment, the water is bidistilled to eliminate trace metals. Preferably the water is bidistilled, deionized, deionized distilled, or reverse osmosis water and at 22-27° C. has a conductivity of less than 10 $\mu S \cdot cm^{-1}$, preferably less than 1 $\mu S \cdot cm^{-1}$, a resistivity greater than 0.1 $M\Omega \cdot cm$, preferably greater than 1 $M\Omega \cdot cm$, more preferably greater than 10 $M\Omega \cdot cm$, a total solid concentration less than 5 mg/kg, preferably less than 1 mg/kg, and a total organic carbon concentration less than 1000 µg/L, preferably less than 200 µg/L, more preferably less than 50 µg/L.

Where water and one or more organic solvents are used together as extraction medium, the extraction medium may comprise 30-99 wt %, preferably 50-90 wt %, more preferably 60-80 wt % water based on the total extraction medium weight. For example, an extraction medium may comprise 75-80 wt % water and 20-25 wt % ethanol. In other embodiments, the extraction medium may comprise 1-70 wt %, preferably 10-50 wt %, more preferably 20-40 wt % of one or more organic solvents relative to the total extraction medium weight. The water and one or more organic solvents may be miscible, partially miscible, or immiscible. Where two organic solvents are used, they may have mass ratios of 10:1-1:10, preferably 5:1-1:5, more preferably 2:1-1:2 with each other.

In a preferred embodiment, water may be used as the extraction medium to produce an aqueous extract. As defined here, an aqueous extract is formed when an extraction process is carried out using a liquid extraction medium comprising 65-100 wt % water, preferably 70-100 wt % water, more preferably 80-100 wt % water.

In one embodiment, a reagent may be added to a liquid extracting medium to improve extraction efficiency, and the reagent may be an acid, base, salt, surfactant, or enzyme. One or more of these reagents may be added until the amount of reagent reaches 0.001-5 wt %, preferably 0.01-2 wt %, more preferably 0.1-1 wt % of the total liquid extracting medium and reagent weight. The acid may be carbonic acid, sulfuric acid, hydrochloric acid, formic acid, citric acid, malic acid, adipic acid, tannic acid, lactic acid, ascorbic acid, acetic acid, fumaric acid, and mixtures thereof. The bases may be sodium hydroxide, lithium hydroxide, potassium hydroxide, sodium carbonate, potassium carbonate, sodium bicarbonate, potassium bicarbonate, magnesium carbonate, calcium carbonate, ammonium hydroxide, substituted amine bases, ammonia, and mixtures thereof. The salt may be sodium chloride, sodium nitrate, potassium chloride, calcium chloride, magnesium chloride, ammonium chloride, sodium bromide, potassium bromide, calcium bromide, magnesium bromide, ammonium bromide, sodium iodide, potassium iodide, calcium iodide, magnesium iodide, ammonium iodide, sodium sulfate, potassium sulfate, calcium sulfate, magnesium sulfate, ammonium sulfate, and mixtures thereof. Surfactants are compounds that lower the surface tension of a liquid, the interfacial tension between two liquids, or between a liquid and a solid. Surfactants may act as detergents, wetting agents, emulsifiers, foaming agents, and dispersants. The surfactant may be cationic, anionic, or nonionic and may include polysorbate 20, polysorbate 40, polysorbate 60, polysorbate 80, Triton X-100, sodium dodecylbenzenesulfonate, cetrimonium bromide, benzalkonium chloride, and sodium lauryl sulfate. An enzyme may be a lipase, glucoamylase, a cellulase, bromelain, an amylase, papain, hemicellulase, phytase, a nuclease, pepsin, trypsin, or some other protease.

According to a third aspect, the present disclosure relates to a supercapacitor including the hydrogel electrolyte of the first aspect.

In an embodiment, the supercapacitor includes an anode, a cathode, and the hydrogel electrolyte of the first aspect.

In an embodiment, the anode and the cathode have a surface of a conductive carbonaceous material in contact with the hydrogel electrolyte.

In some embodiments, the supercapacitor includes the conductive carbonaceous material which is at least one selected from a group consisting of graphite, activated carbon, reduced graphene oxide, carbon nanotubes, carbon nanofibers, and carbon black.

In some embodiments, the supercapacitor has a power density of 100 to 800 W/kg, preferably 150 to 700 W/kg, preferably 200 to 600 W/kg, preferably 200 to 500 W/kg.

In some embodiments, the supercapacitor has an energy density of 30 to 200 W·h/kg, preferably 40 to 180 W·h/kg, preferably 50 to 160 W·h/kg, preferably 50 to 120 W·h/kg.

In some embodiments, the supercapacitor has at least 80 to 99%, preferably 85 to 95%, preferably 90% of the initial specific capacitance maintained after 70,000 to 14,000 charge-discharge cycles, preferably 80,000 to 13,000 charge-discharge cycles, preferably 90,000 to 12,000 charge-discharge cycles.

In some embodiments, the supercapacitor has a specific capacitance of 100 to 700 F/g, preferably 200 to 600 F/g, preferably 300 to 550 F/g, preferably 380 to 500 F/g at 0.1 to 1.5 mA, preferably 0.1 to 1.0 mA, preferably 0.1 to 0.9 mA, preferably 0.2 to 0.8 mA.

In some embodiments, a supercapacitor has an equivalent series resistance of 1 to 20 Ohm, preferably 2 to 15 Ohm, preferably 3 to 11 Ohm.

In some embodiments, a supercapacitor assembly includes 1 to 20, preferably 1 to 15, preferably 2 to 12, preferably 2 to 10 of the supercapacitors connected in parallel and/or in series.

Using non-toxic quasi solid-state bio-polymer electrolyte hydrogels in devices may pave the way for safe usage in emerging wearable electronics and energy storage systems.

In some embodiments, a light-emitting diode device includes the supercapacitor wherein the supercapacitor is electrically connected to the light-emitting diode; and the supercapacitor functions like a battery.

EXAMPLES

The following examples demonstrate the hydrogel electrolyte for the supercapacitor described herein. The examples are provided solely for illustration and are not to be construed as limitations of the present disclosure, as many variations thereof are possible without departing from the spirit and scope of the present disclosure.

Materials

Sodium carboxymethyl cellulose (C) (average molar mass Mw=250 kDa) was received from Sigma Aldrich (Sigma-Aldrich, Inc., St. Louis, MO 68178 US), whereas, the plant material (*Hibiscus sabdariffa*) was obtained from a local pharmacy. The citric acid (CA) 99.6%, on the other hand, was purchased from Thermo Scientific. 2-Kuraray active carbon, Polyvinylidene fluoride (HSV 900 PVDF) binder, Timical super C65 (conductive additive), and conductive carbon were obtained from MTI corporation, and 1-methyl-2-pyrrolidone (NMP) was bought from Merck. Throughout all experiments, deionized water (DI water, Millipore Simplicity™) was used.

Instrumentations

Fourier-Transform Infrared (FT-IR) Spectra

The FT-IR spectra analysis of hydrogel electrolyte was achieved in the range of 400-4000 $cm^{-1}$ by using Shimadzu IRSpirit. Thermogravimetry (TG) measurements were carried out using PerkinElmer Pyris 1 TG Analyzer to study the thermal stability by heating the sample under inert atmospheric conditions from ambient temperature to 750° C., at a rate of 10° C. $min^{-1}$. A Hitachi DSC 7000x instrument was used for differential scanning calorimetry (DSC) measurements under an inert atmosphere at a heating rate of 10° C. $min^{-1}$.

Electrochemical Analysis

Electrochemical analysis was conducted by performing cyclic voltammetry (CV) and galvanostatic charge-discharge (GCD) analysis on fabricated devices. CV studies were performed using an electrochemical analyzer (CorrTest CS3004) at scan rates of 5 to 50 mV $s^{-1}$, whereas GCD studies were conducted using a moving target indicator (MTI) Battery Analyzer at current densities from 1 to 5 A $g^{-1}$ with a cut off voltage of 0-1.2 V. Dielectric properties of the samples were analyzed by impedance analyzer (Novocontrol Technologies). The surface morphology of the nanospheres was studied through scanning electron microscopy (SEM) (TESCAN Vega3).

Stable and scalable blends were produced, and an ion transport was effectively enhanced via insertion of H, which occurred through sodium ($Na^+$) and hydronium ($H_3O^+$) ions from a corresponding "host and guest", where no external salt as ion source was inserted. Results showed that H in the hydrogel improved the ionic conductivity while maintaining homogeneity and electrochemical stability. CCAH was coated on carbon composite electrodes, and devices were assembled, followed by experimental analysis under ambient conditions.

Figure 2A:
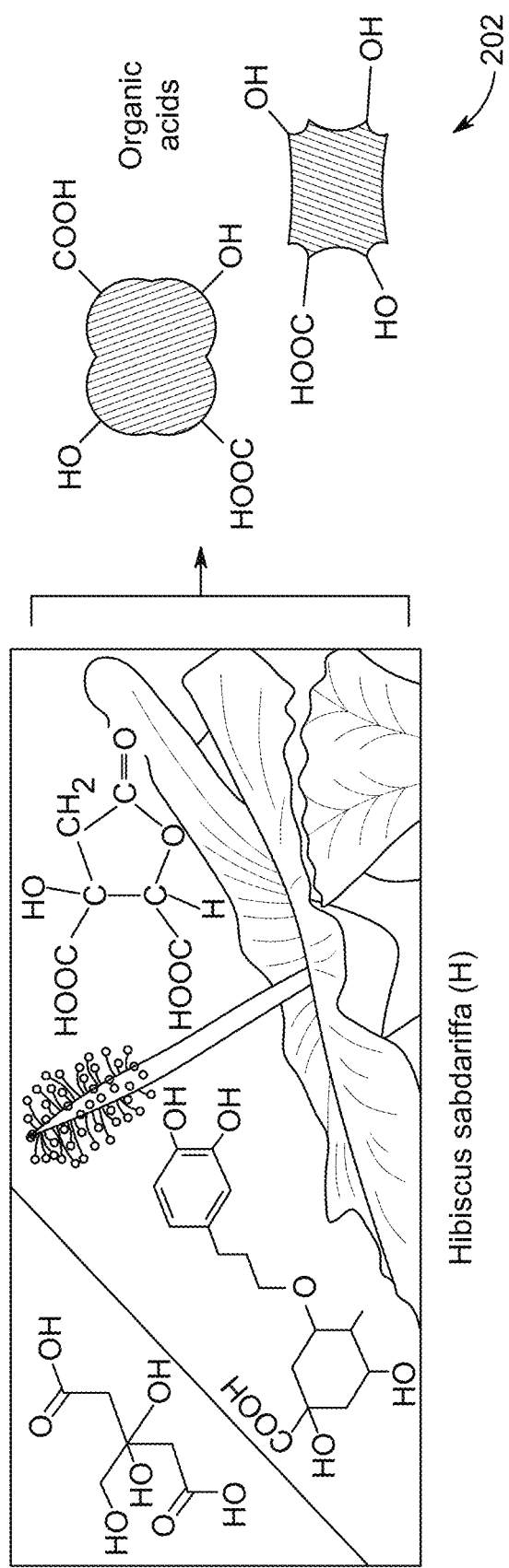
FIG. 2A illustrates a *Hibiscus sabdariffa* flower and its chemical structures, according to certain embodiments.
Figure 2B:
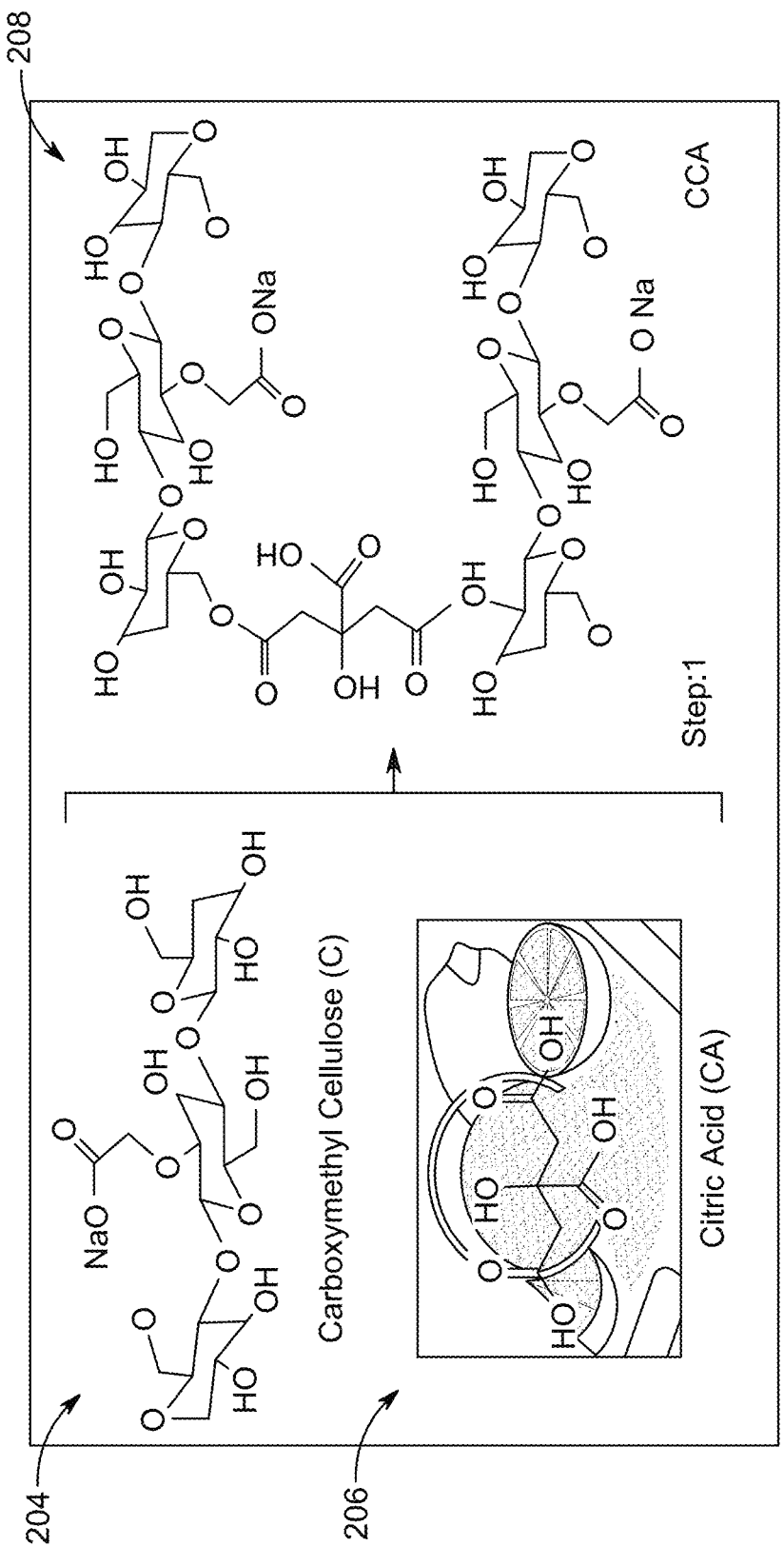
FIG. 2B illustrates a scheme of formation of polymer hydrogel electrolyte by addition of a carboxymethyl cellulose powder and a citric acid, according to certain embodiments.
Figure 2C:
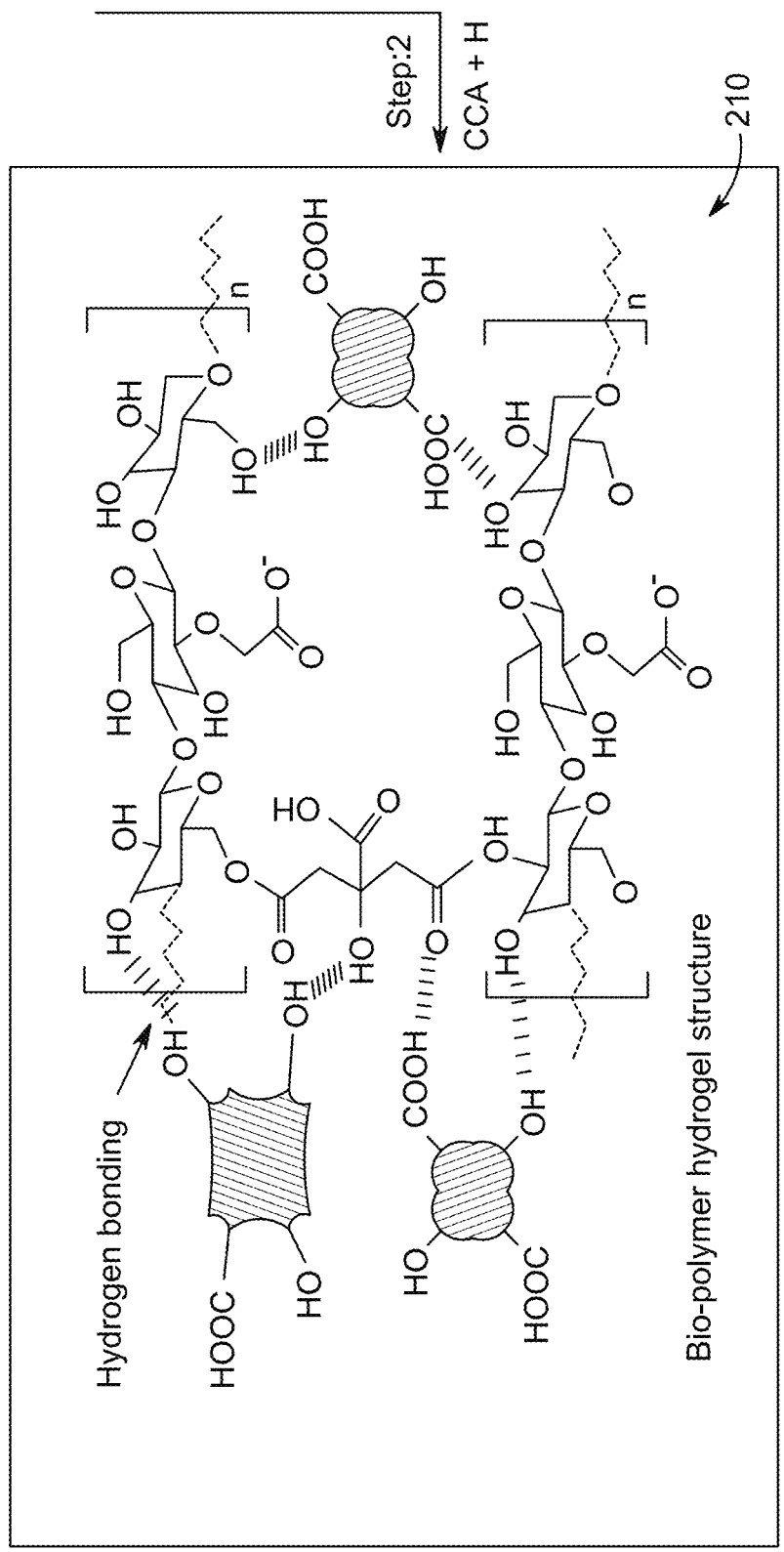
FIG. 2C illustrates a scheme of formation of polymer hydrogel electrolyte by addition of *Hibiscus sabdariffa*, according to certain embodiments.

FIG. 2A illustrates the chemical structure of *Hibiscus sabdariffa* (H) 202. FIGS. 2B-2C illustrates the scheme of hydrogel synthesis of polymer hydrogel electrolyte preparation was performed in two steps. FIG. 2B illustrates step 1 208; 2.0 g of sodium carboxymethyl cellulose powder (C) 204 was mixed with 80 mL of DI water at room temperature until dissolved homogeneously. After dissolution, 10 ml of 5% citric acid (CA) 206 solution was added and homogenized for 20 minutes. FIG. 2C illustrates step 2 210; different amounts of H 202 (1.5 g, 2 g, and 3 g (abbreviated as H1.5, H2, and H3 respectively)) were weighed and mixed with 20 mL of DI water at room temperature. Aqueous extract of H 202 was mixed with the polymer hydrogel obtained from step 1 208. The resulting reddish polymer hydrogel electrolyte was dried at 60° C. under vacuum for 4 hours to produce a film.

Figure 3A:
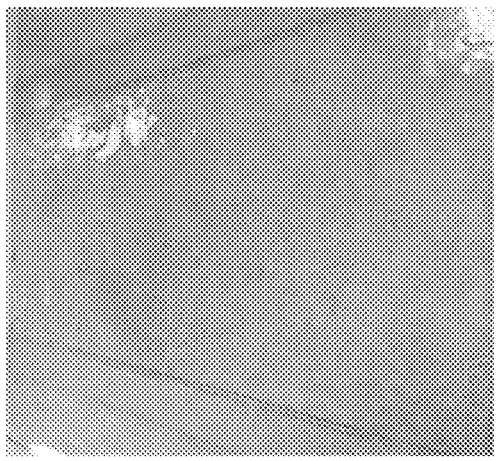
FIG. 3A illustrates bio-polymer hydrogel electrolytes (PHE) cast on a glass, according to certain embodiments.
Figure 3B:
FIGS. 3B-3C illustrate transparent and highly flexible PHE thin-film removed from the glass surface, according to certain embodiments.
Figure 3C:
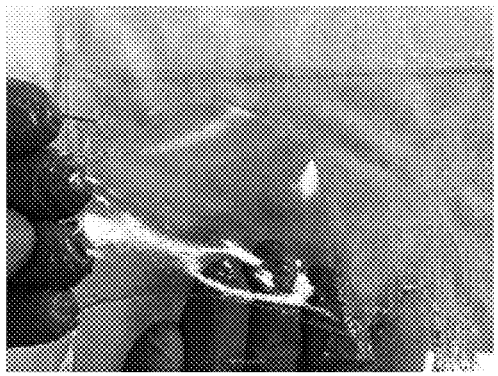
Figure 3D:
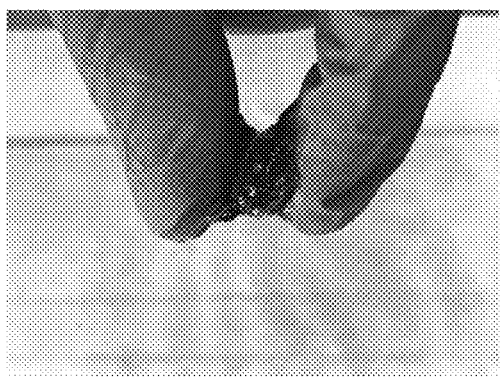
FIGS. 3D-3G illustrate the flexibility of the PHE, according to certain embodiments.
Figure 3E:
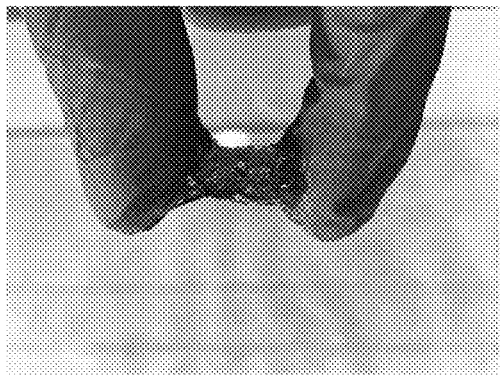
Figure 3F:
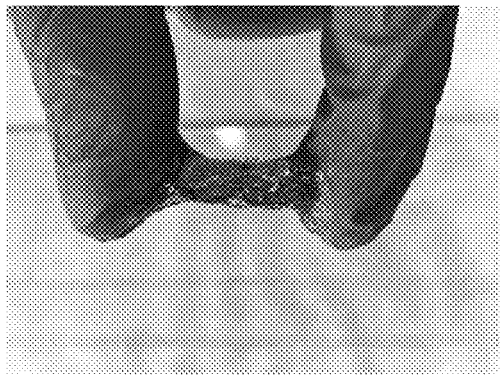
Figure 3G:
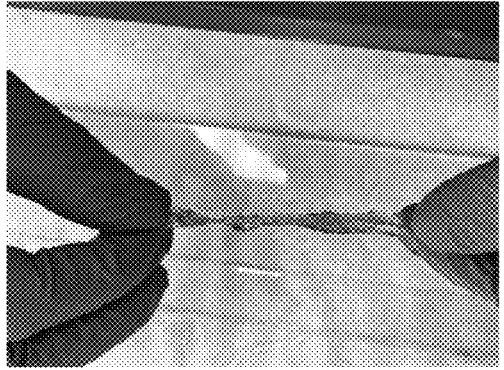

Scalable biopolymer electrolyte production was critical for the fabrication of safe energy storage systems. FIG. 3A shows the casting of bio-polymer hydrogel electrolytes (PHE) onto a glass substrate using a simple common tape-casting method, resulting in size controllable a very thin film layer with a thickness of 20 μm. FIG. 3B-FIG. 3C illustrates highly flexible and transparent PHE film which was collected (after 4 h incubation at 60° C.). In addition to being produced as a film, PHE might also be produced in gel form with high flexibility state. FIGS. 3D-3E show that the PHE was produced in gel form and its flexibility was tested. As shown in the FIGS. 3A-3E, PHE was a suitable material for the production of both thin films and gel form. These unique features of the hydrogel electrolyte show that the all-bio system could be used for various high-tech applications.

Figure 4:
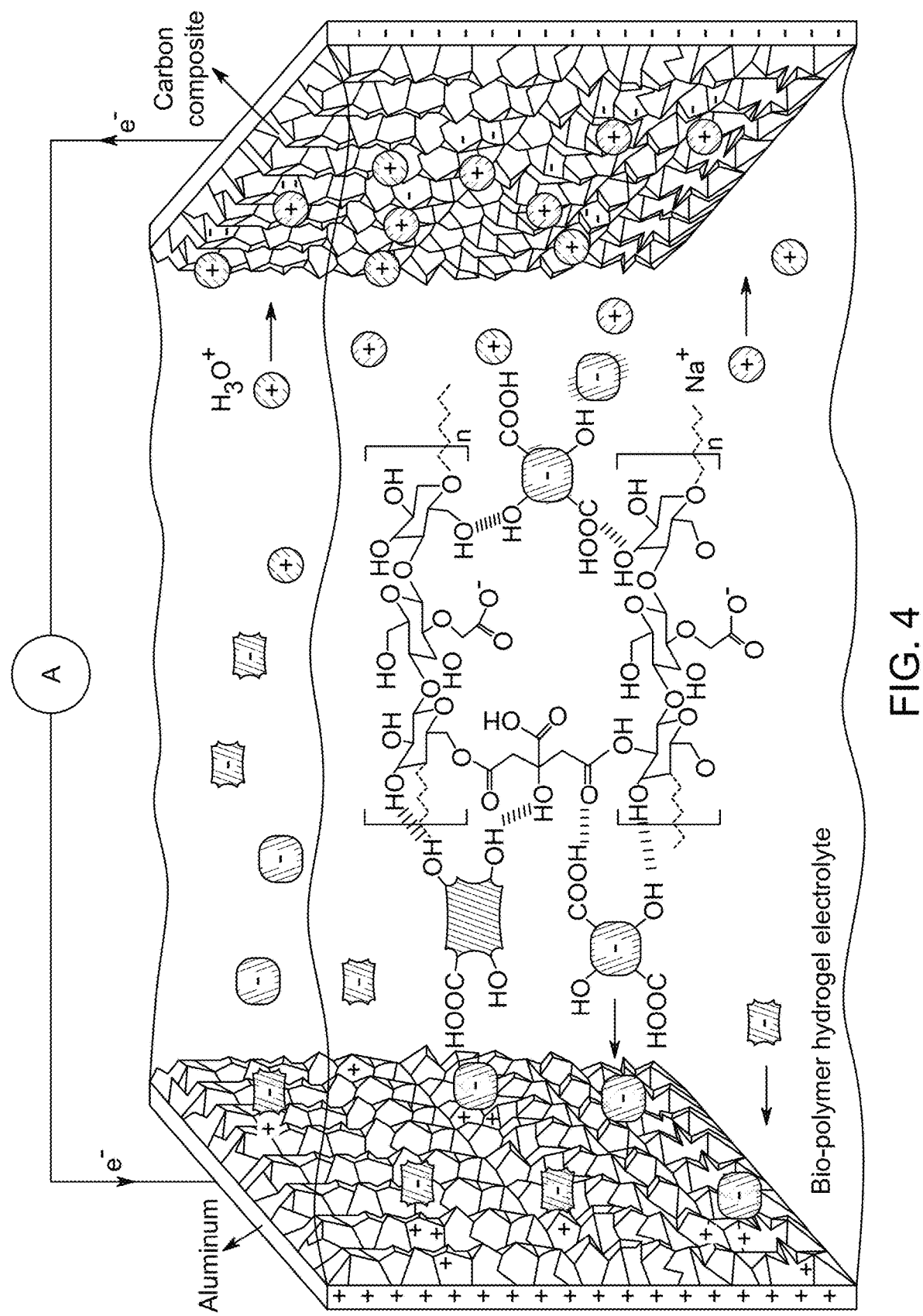
FIG. 4 illustrates a schematic illustration of a supercapacitor working mechanism, according to certain embodiments.

The carbon-composite electrodes, containing conductive additive and activated carbon, were used to fabricate a symmetric supercapacitor. Swagelok split cell assembly was used for supercapacitor performance tests in a device orientation of carbon-composite/PHE/carbon-composite. In the fabrication of highly flexible supercapacitors, PHE was used both as an electrolyte and as a separator, resulting in a highly efficient device. PHE created a very harmonious environment for excellent ion transfer. FIG. 4. illustrates the proposed polarization of the molecules in the electrolyte and the formation of a double layer capacitor in the supercapacitor charge-discharge phenomena. Sodium ions ($Na^+$) from the carboxymethyl cellulose structure and hydronium ($H_3O^+$) ions, which were likely to be obtained from organic acids in H, were given to the supercapacitor electrodes as a positively charged cations. H is connected to the polymer structure via hydrogen bonds and could form a negatively charged zone throughout the electrolyte, and unbound organic acids contribute to the environment as negatively charged anions during the charge-discharge process. High energy storage capacity could be explained by excess ions provided by H that is composed of 17 different acidic derivatives leading to faster ion diffusion between carbon composite electrodes.

Figure 5A:
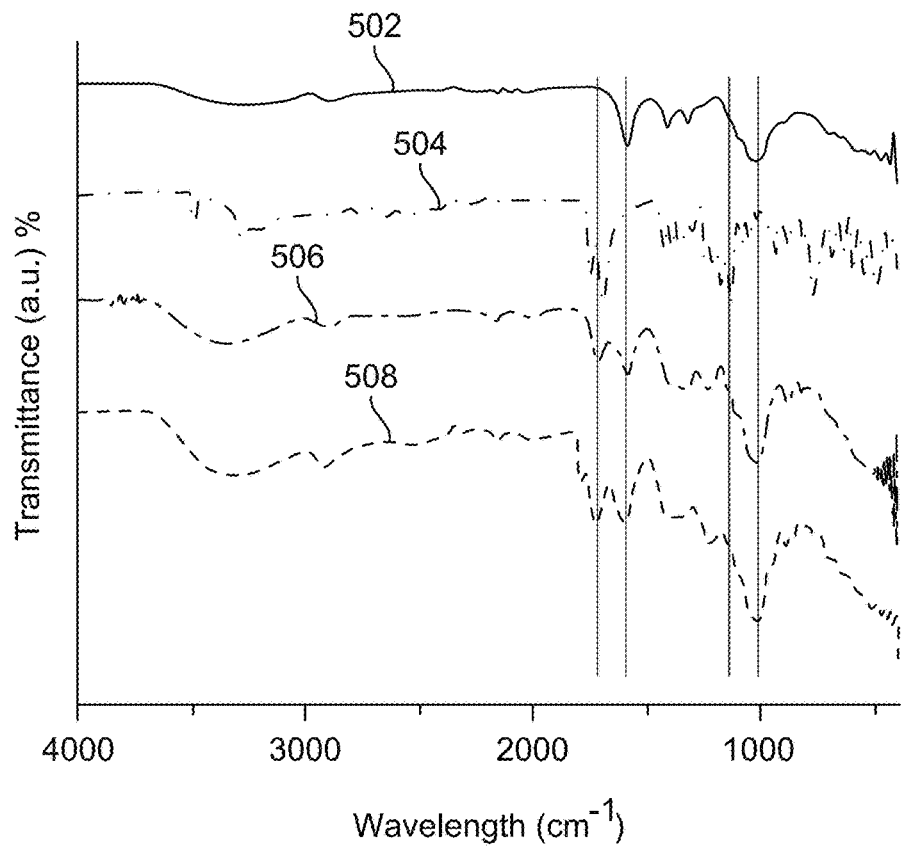
FIG. 5A illustrates a Fourier-transform infrared (FT-IR) spectrum of the C, CA, CCA, and CCAH2, according to certain embodiments.

FIG. 5A illustrates the FT-IR spectra of pristine C 502, CA 504, CCA 506, and the electrolyte CCAH 508. Carboxymethyl cellulose (C) 502 showed major vibrational bands related to carboxylates asymmetric stretching at (COO—) at 1589 cm$^{-1}$ and symmetric stretching at 1423 cm$^{-1}$ and 1321 cm$^{-1}$. The C=O vibrations from primary alcohol were observed at 1020 cm$^{-1}$(C—OH). Similarly, CA 504 spectrum illustrates a strong C=O band stretch centered at 1706 cm$^{-1}$. After the reaction of C 502 and CA 504, the intensity of the peak corresponding to C 502 at 1589 cm$^{-1}$ decreased and overlapped with the carbonyl peak of CA 504 at 1715 cm$^{-1}$. The dried hydrogel showed a relatively broad peak around 3400-3200 cm$^{-1}$ due to —OH of C 502 and existing humidity. As reported, the depletion of hydroxyl groups of C's 502 during the cross-linking as a result of a chemical reaction with citric acid, consequently produced ester bonds. In addition, the increase of the peak at 1225-1230 cm$^{-1}$ in the cross-linked hydrogels was ascribed to esterification. The broad bands from 1200 to 1000 cm$^{-1}$ were due to —OH and C—O—C— for the final polymer electrolytes.

Figure 5B:
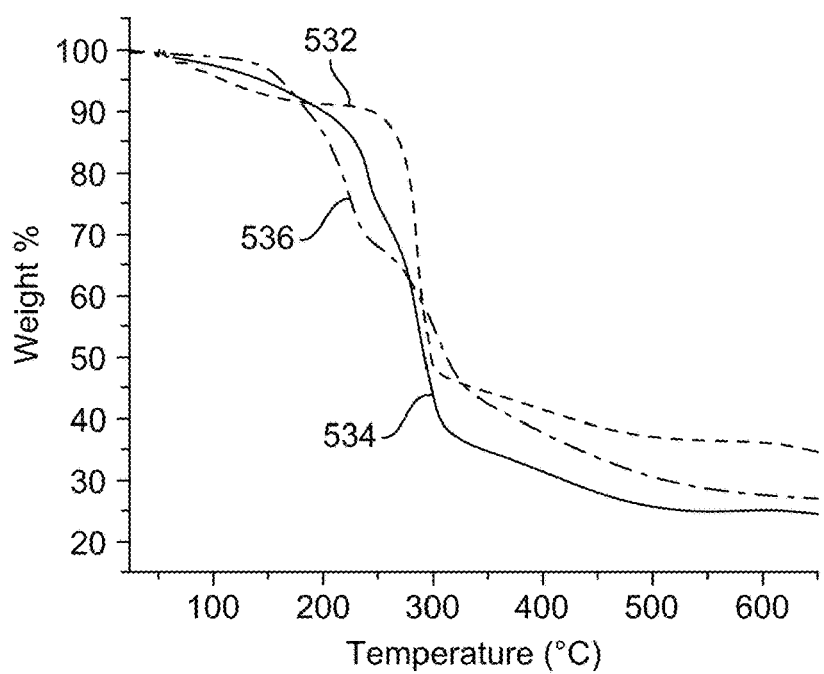
FIG. 5B illustrates a thermogravimetric analysis (TGA) curves of C, CCA, and CCAH2, according to certain embodiments.

FIG. 5B illustrates TG thermograms of pristine C 532, CCA 534, and the electrolyte CCAH2 536 was recorded from the room temperature to 700° C. under the N$_2$ environment. A slight weight loss (one step) was observed for the pristine C 532 and CCA 534 until 245° C. and 200° C., respectively, which could be due to the elimination of the absorbed humidity. However, CCAH (508) hydrogel displayed two degradation steps. Clearly, CCAH (508) was stable up to 150° C., and then multistep degradation occurred at higher temperatures.

Figure 6:
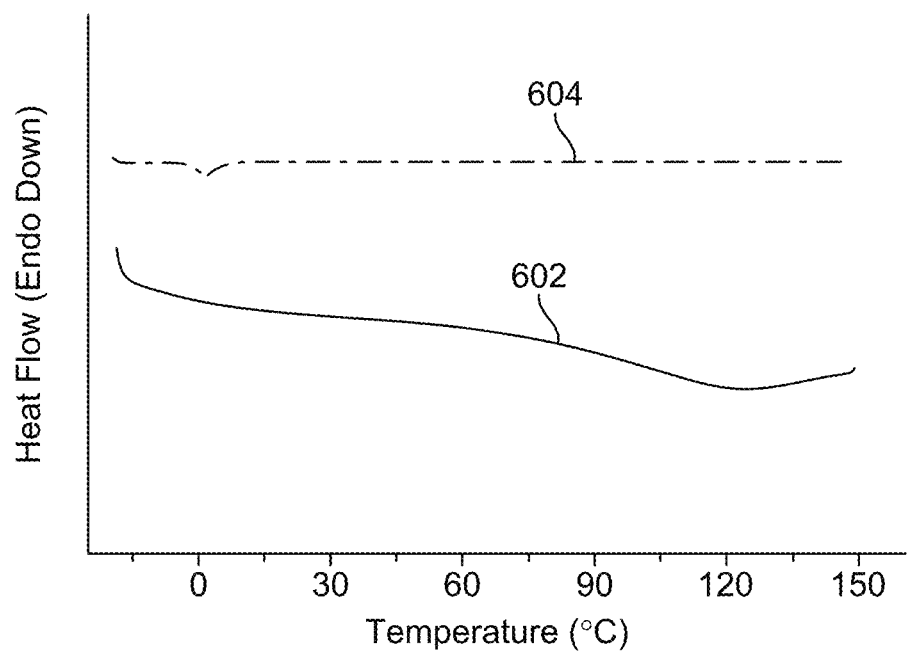
FIG. 6 illustrates the DSC measurement of the CCAH2 hydrogel and CCAH2 film, according to certain embodiments.

FIG. 6 illustrates the differential scanning calorimetry (DSC) curves of the CCAH2 hydrogel 602 and fully dried film of CCAH2 604. The PHE had a melting temperature centered around 0° C. belonging to water, whereas the dry electrolyte had a glass transition temperature at 90° C.

Figure 5C:
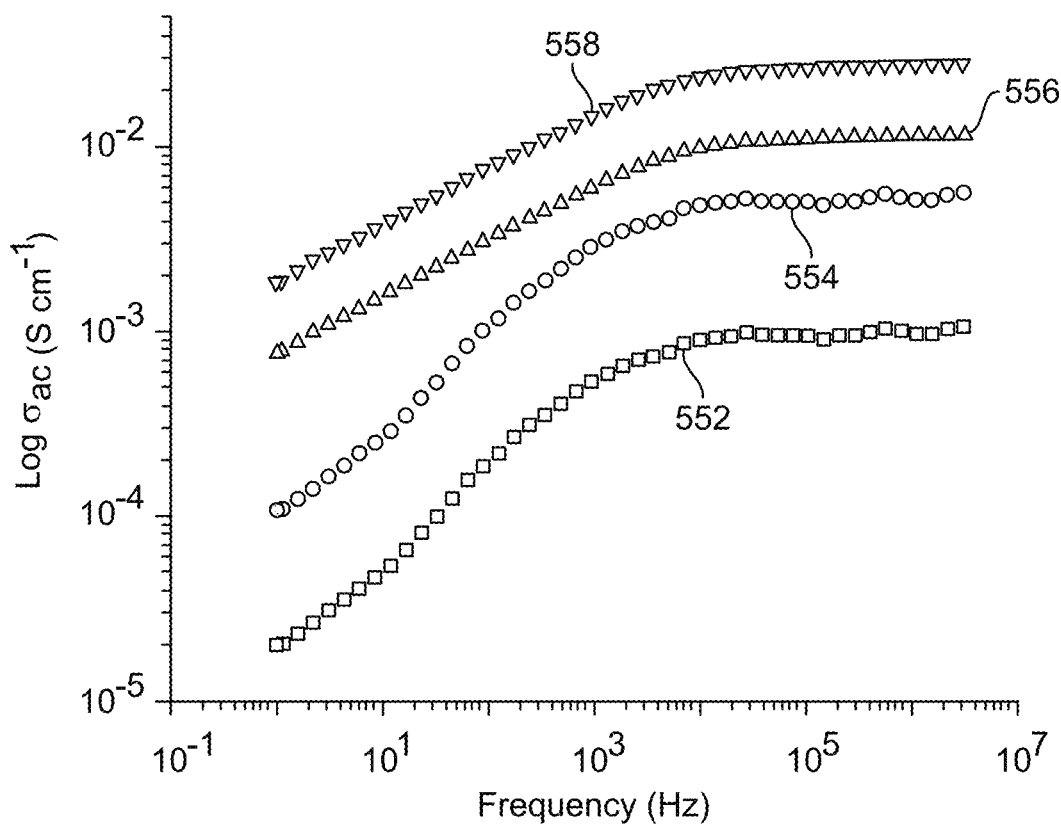
FIG. 5C illustrates a differential scanning calorimetry (DSC) curves of CCAH2 hydrogel and CCAH2 film, according to certain embodiments.

FIG. 5C shows the $\sigma_{ac}$ (=$\sigma'(\omega)$) versus frequency of CCAH2 at varied temperatures from 0° C. 552. 10° C. 554, 20° C. 556 and 30° C. 558 $\sigma_{ac}$ was calculated according to Eq (1).

$$\sigma'(\omega)=\sigma ac(\omega)=\varepsilon''(\omega)\omega\varepsilon o \qquad (1)$$

Real part of the conductivity is $\sigma'(\omega)$, angular frequency is $\omega=2\pi f$, vacuum permittivity ($\varepsilon_0=8.852\times10^{-14}$ F cm$^{-1}$) is $\varepsilon_o$ and the imaginary part of the complex dielectric permittivity ($\varepsilon^*=\varepsilon'-i\varepsilon''$) is $\varepsilon''$.

Figure 5D:
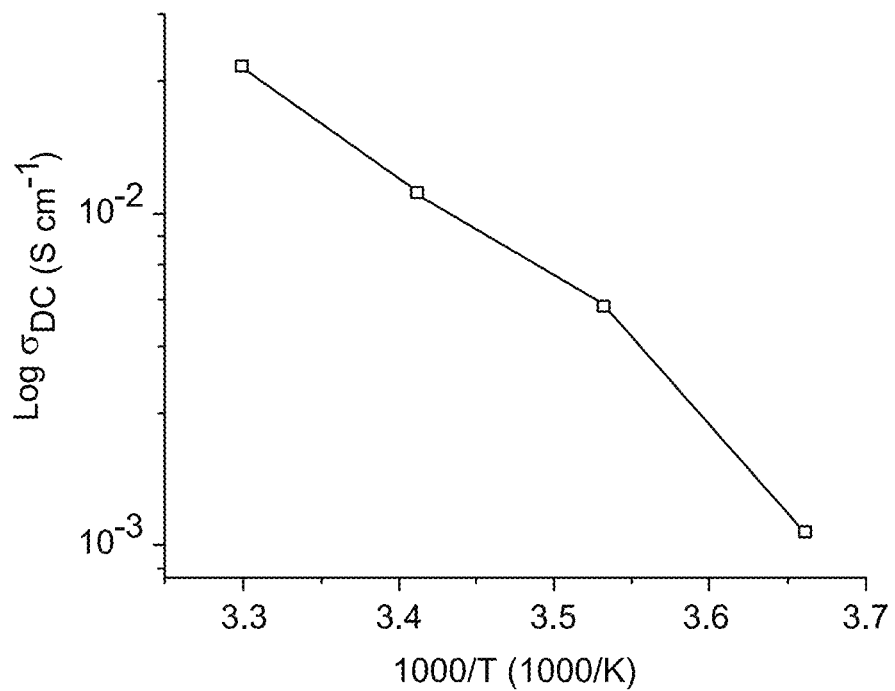
FIG. 5D illustrates an alternating current (AC) impedance of CCAH2, according to certain embodiments.

The curve included frequency-dependent conductivity in lower frequency domains due to electrode polarization and frequency-independent plateau regions (at intermediate or higher frequencies). The $\sigma_{dc}$ corresponds to the ion conductivity of the biopolymer electrolytes. FIG. 5D illustrates the $\sigma_{dc}$ value of the CCAH2 as a function of temperature. Clearly, the ion conductivity increased linearly with temperature. The maximum ion conductivity of 0.01 S cm$^{-1}$ was reached at room temperature indicating the faster ion mobility throughout the hydrogel with a thermally activated process.

Figure 7A:
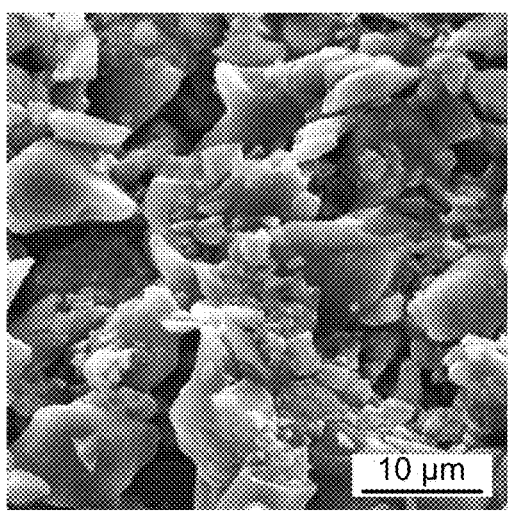
FIGS. 7A-7B illustrate a surface of uncoated carbon composite electrode (low and high magnification), according to certain embodiments.
Figure 7B:
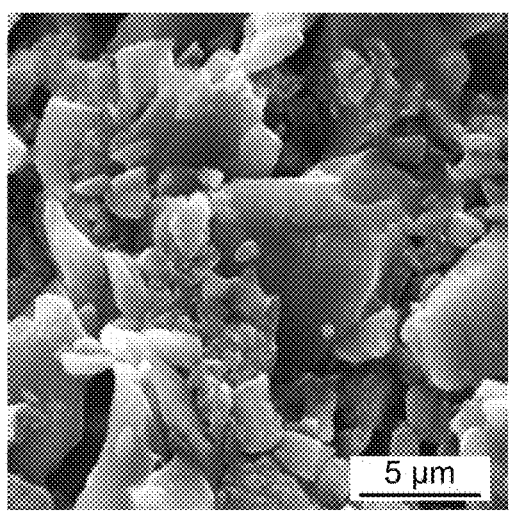
Figure 7C:
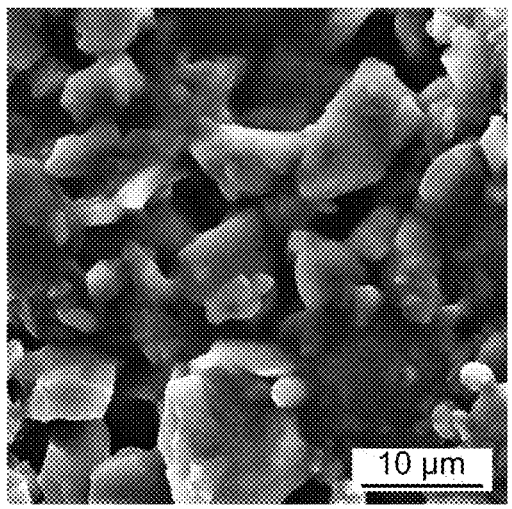
FIGS. 7C-7D illustrate a thin-film cast on carbon electrodes, according to certain embodiments.
Figure 7D:
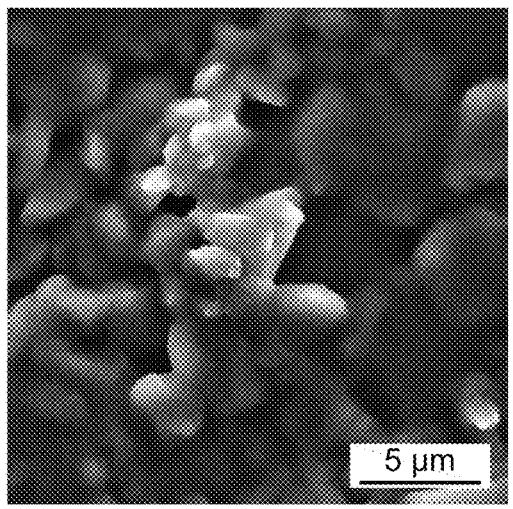
Figure 7E:
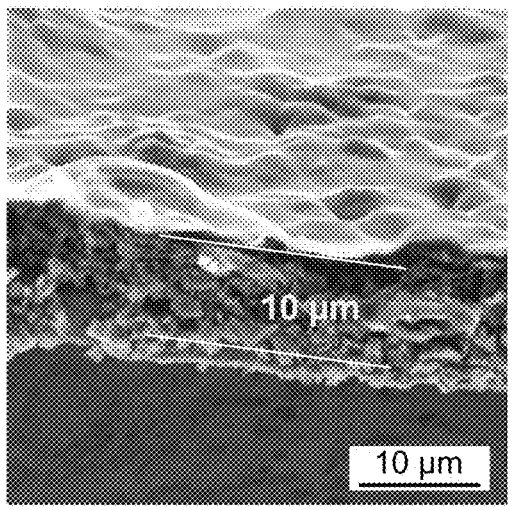
FIGS. 7E-7F illustrates a cross-sectional image of the electrode coated with electrolyte, CCAH2, according to certain embodiments.
Figure 7F:
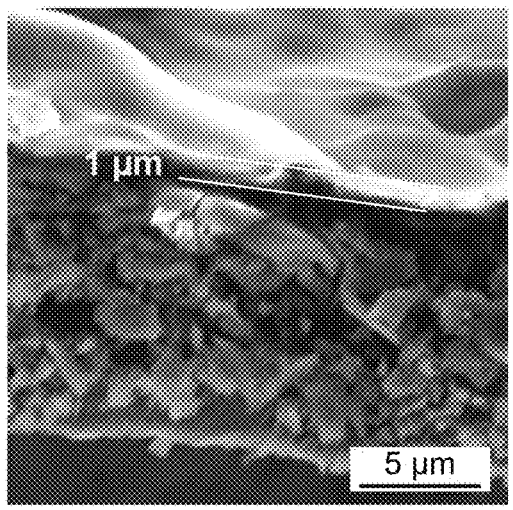

FIGS. 7A-7B illustrate the surface microstructures of the carbon composite electrodes at low and high magnifications i.e., 5 micrometer (μm) and 10 μm. A porous structure of active carbon and conductive carbon particles with homogeneous electrode surfaces are observed. FIGS. 7C-7D show a thin electrolyte film coated by casting the electrolyte directly onto the electrode. FIGS. 7E-7F illustrate the cross-section of the electrolyte-coated electrode which is demonstrated with different magnifications. It was observed that a thin and controllable electrolyte film was formed on the electrode surface, covering the entire electrode surface uniformly.

Figure 8A:
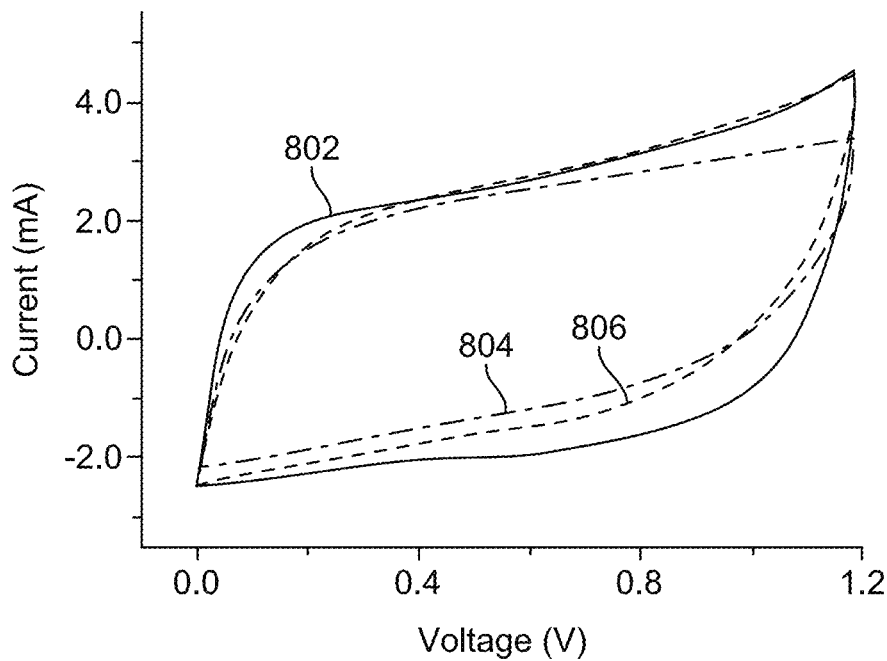
FIG. 8A illustrates a comparison of a cyclic voltammetry (CV) of CCAH2, H2 and CAH2 a scan rate of 5 mV s$^{-1}$, according to certain embodiments.
Figure 8B:
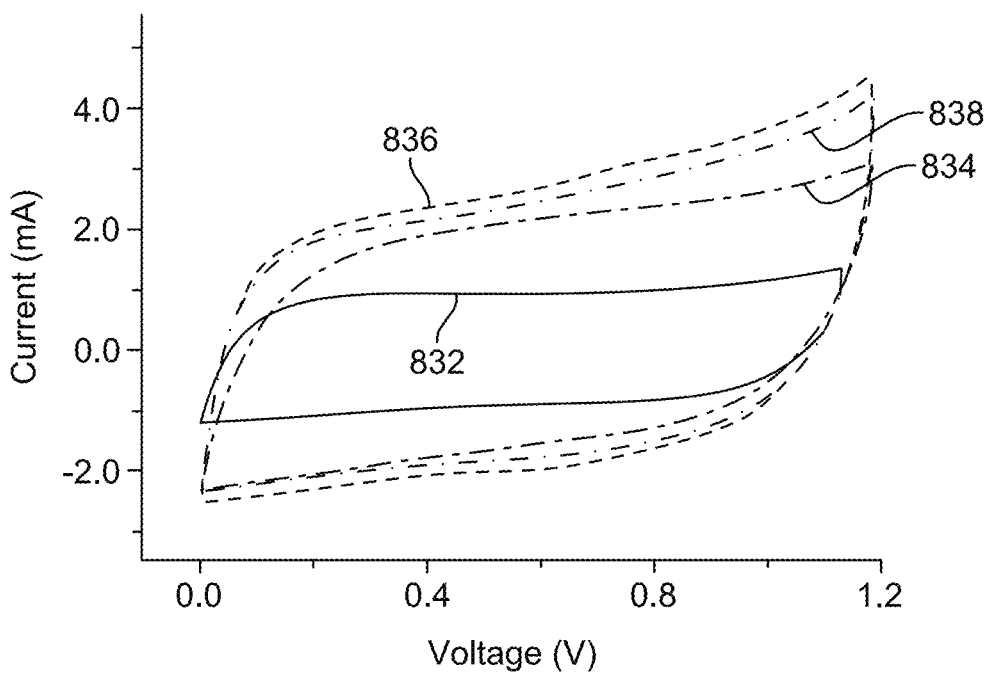
FIG. 8B illustrates the CV of CCA, CCAH1.5, CCAH2, CCAH3 based supercapacitor at a scan rate of 5 mV s$^{-1}$, according to certain embodiments.
Figure 8C:
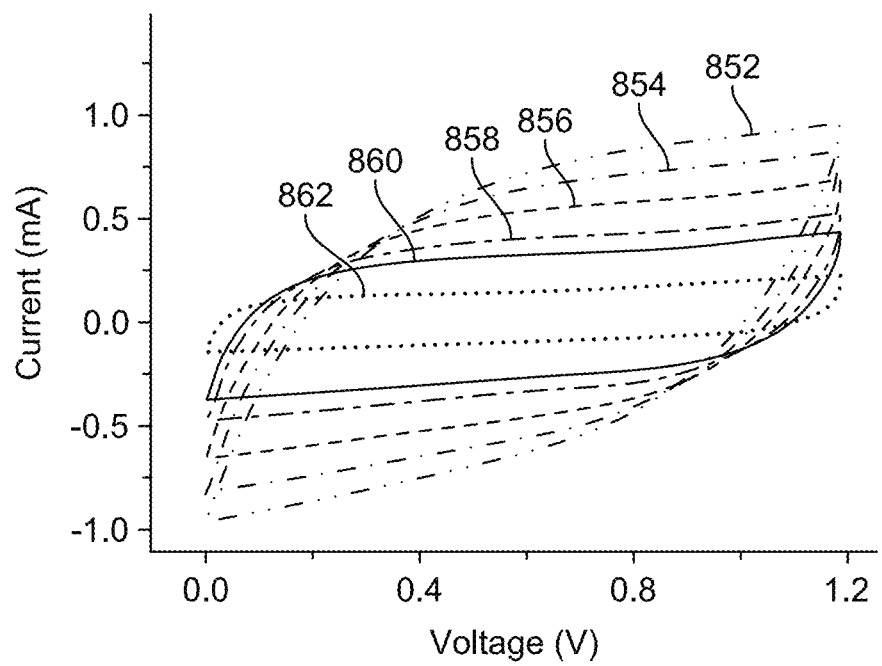
FIG. 8C illustrates the CV of CCAH2 at different scan rates 5-50 mV s$^{-1}$, according to certain embodiments.
Figure 8D:
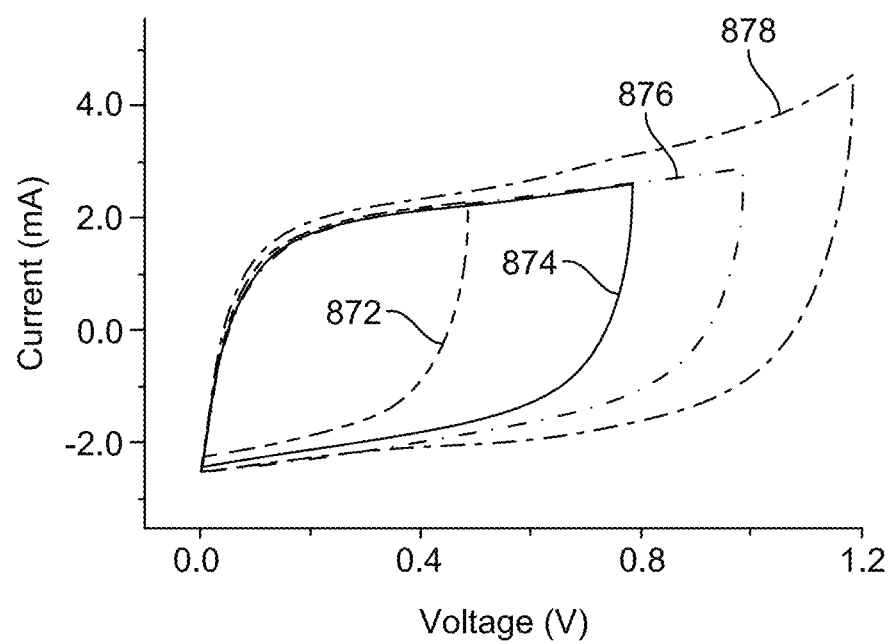
FIG. 8D illustrates the CV curves of CCAH2 based supercapacitor at different potential windows (0.5 V-1.2 V), according to certain embodiments.
Figure 8E:
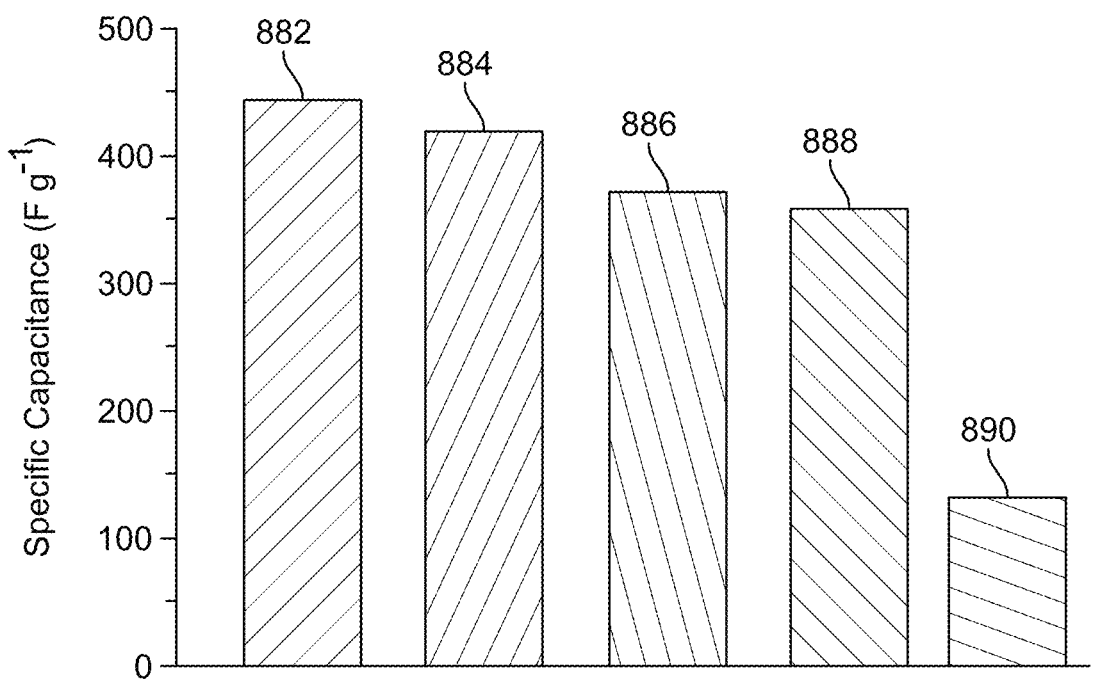
FIG. 8E illustrates specific capacitances of supercapacitors containing different electrolytes, according to certain embodiments.
Figure 8F:
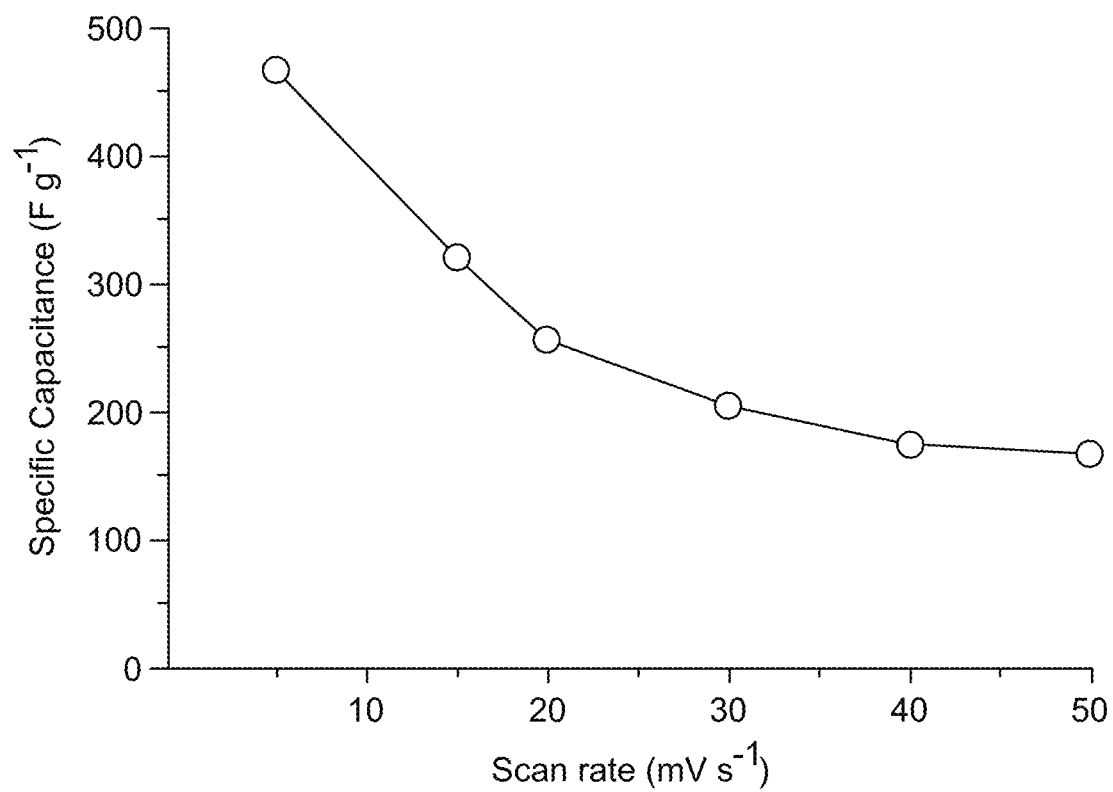
FIG. 8F illustrates specific capacitance of CCAH2-based device at different scan rates, according to certain embodiments.

FIG. 8A depicts the CV plot of CCAH2 802, H2 804 and CAH2 806 containing supercapacitors at a scan rate of 5 mV s$^{-1}$. The measurements were performed at a potential window of 0-1.2 V (volts). All devices exhibited rectangular CV voltammograms, which revealed an electrical double-layer (EDL) capacitive behavior was attained in all devices. H2 containing device delivered a relatively high capacitive behavior and slightly decreased for subsequent compositions measurement. FIG. 8B illustrates the CV plot of CCA 832, CCAH1.5 834, CCAH2 836, and CCAH3 838 containing supercapacitors at a scan rate between 5-50 mV s$^{-1}$. The carboxymethyl cellulose which provided a suitable environment after partially linked with CA and the supercapacitor device containing CCAH2 electrolyte exhibited an enhanced capacitance with excellent cyclic stability based on the CV area under the forward and reverse scan. The rate capability of the supercapacitors was tested at different scan rates between 5-50 mV s$^{-1}$. FIG. 8C illustrates the device containing supercapacitor containing CCAH2 electrolyte which has maintained its quasi-rectangular CV shapes in forward-reverse at low and high scanning rates attributing a superior diffusion-controlled charge transfer in various plots 5 mV s$^{-1}$ 852, 15 mV s$^{-1}$ 854, 20 mV s$^{-1}$ 856, 30 mV s$^{-1}$ 858, 40 mV s$^{-1}$ 960 and 50 mV s$^{-1}$ 962. FIG. 8D illustrates the device with an optimized electrolyte ratio which was tested at a scan rate of 5 mV s$^{-1}$ and a potential range of 0-1.2 V, including 0.5V 872, 0.8V 874, 1.0V 876, and 1.2V 878. FIG. 8E illustrates the highest capacitance was observed for the device containing CCAH2 882, CCAH3 884, CCAH1.5 886, H2 888, and CCA 890 electrolyte. It was clear that the capacitance increased with the addition of H due to the increased concentration of ions in the PHE. Further increase in H concentration caused saturation in the capacitance of the supercapacitor device. Saturation was explained by achieving a higher complexation rate and blocking ion diffusion in PHE. FIG. 8F displays the specific capacitance vs. scan rate (0-50 mV s$^{-1}$) for the CCAH2 electrolyte, based on CV results. The specific capacitance (Cs) of CCAH2 was calculated as 444 F g$^{-1}$ at a low scan rate (5 mV s$^{-1}$), which was comparable with the GCD results. The high Cs at the lower scan rate was mainly due to a high ion conductivity of the electrolyte and faster intercalation of charges/ions between the surface of the electrode.

The device-specific capacitance ($C_s$) was calculated from CV as well as GCD analysis using equation 2 and 3, respectively, $$C_s = \frac{1}{m \times v \times \Delta V} \int_{V1}^{V2} IdV \qquad (2)$$

$$C_s = \frac{I \times \Delta t}{m \times \Delta V} \qquad (3)$$

Since the device capacitance in (F g$^{-1}$) was measured, m represents the total mass of the active material on both of the electrodes, I represent the discharging current, Δt represents the discharging time, v is scan rate, and ΔV is a potential window. Equation (4) and (5) are used to calculate the specific energy ($E_s$) and specific power ($P_s$) of the fabricated supercapacitors, respectively, $$E_s = \frac{1/2 \times C_s \times \Delta V^2}{3.6} \quad (4)$$

$$P_s = \frac{E \times 3600}{\Delta t} \quad (5)$$

Figure 9A:
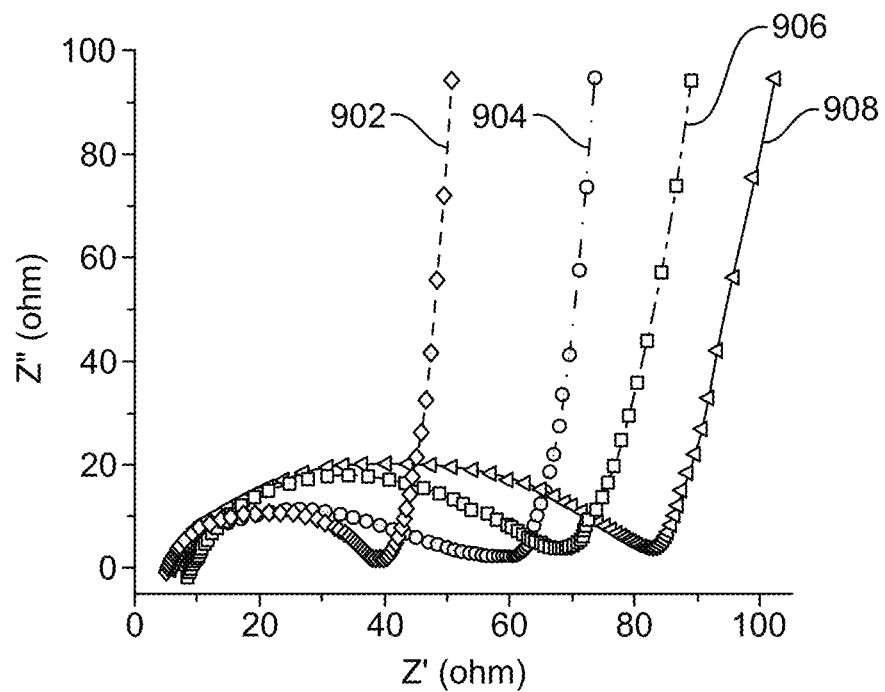
FIG. 9A illustrates a Nyquist plot of supercapacitors CCA, CCAH1.5, CCAH2, and CCAH3, including electrolytes, according to certain embodiments.
Figure 9B:
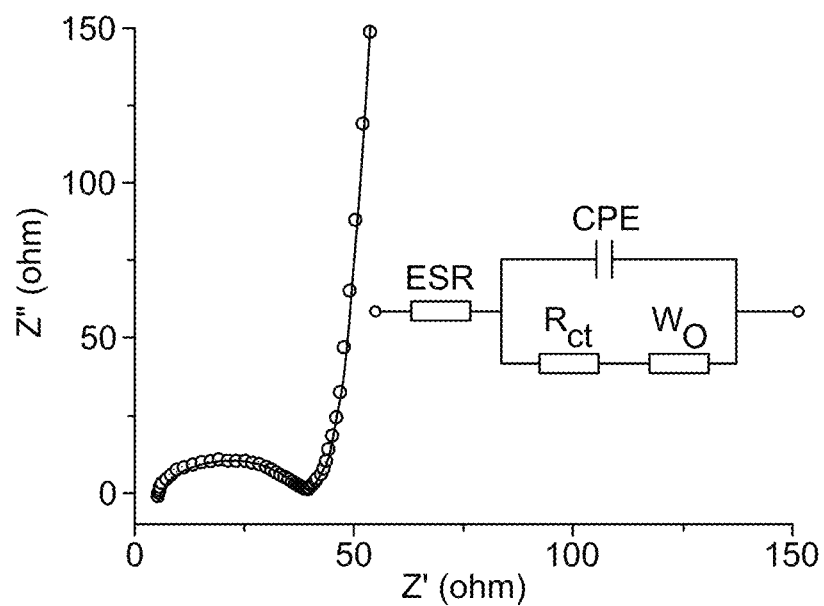
FIG. 9B illustrates a Nyquist curve of CCAH2 based supercapacitor fitting via equivalent circuit diagram, according to certain embodiments.

In FIG. 9A, Nyquist plots are shown for different compositions of the electrolyte, such as CCAH2 902, CCAH3 904, CCAH1.5 906, and CCA 908 using electrochemical impedance spectroscopy. The charge transfer resistance of the device (Rct) is determined by the diameter of its semicircles in the high-frequency region. FIG. 9B illustrates the results which were obtained after fitting the equivalent circuit which showed the Rct values were obtained as 39 Ohm for the CCAH2 device, which is lower than CCAH3, CCAH1.5, and CCA devices (56, 6, 9, and 8 ohms), respectively. The equivalent series resistance (ESR) for the electrochemical system was obtained from the intersection of the curve of the X-axis in the high-frequency region. The device's equivalent series resistance (ESR) was calculated from the intersection at the Z' axis. The ESR values of 7.1, 8.5, 5.4, and 7.6 ohms were obtained from the supercapacitor devices containing CCA, CCAH1.5, CCAH2, and CCAH3, respectively. The Warburg impedance was expressed as the diffusion-controlled charge transport kinetics related to ions entering the electrodes from the electrolyte. A linear line that is parallel to the Y-axis represents a superior ion-diffusion to the electrode surface at all prepared devices.

Figure 9C:
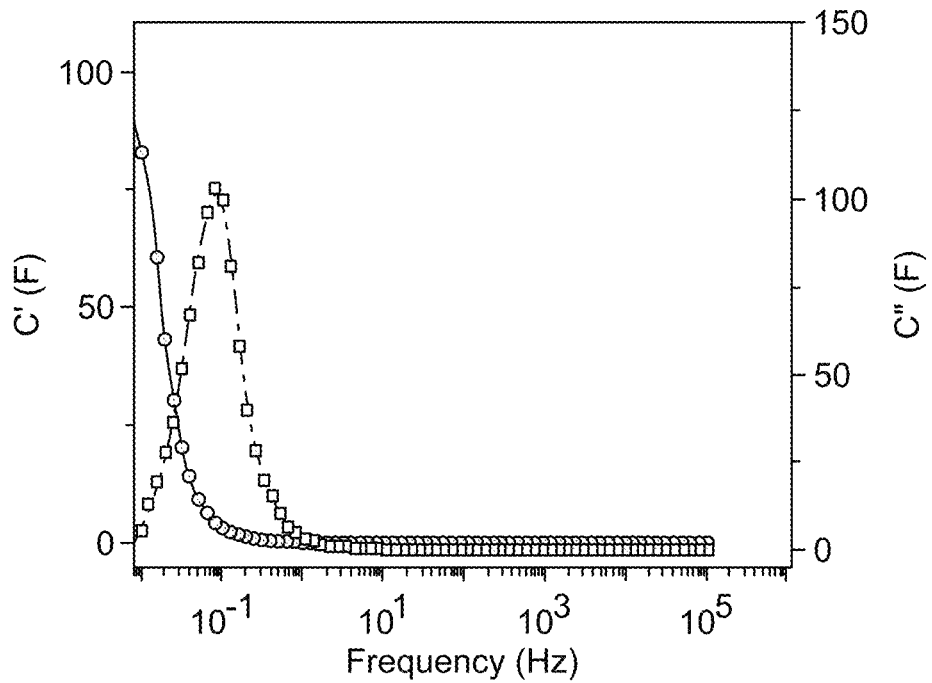
FIG. 9C illustrates complex real (C') complex imaginary capacitance (C") vs. frequency (Hz), according to certain embodiments.

FIG. 9C illustrates the ion diffusion kinetics of the CCAH2 supercapacitor were analyzed by calculating complex capacitance curves, and it was plotted depending on the frequency. The data of complex capacitance (C' and C") are obtained using Eqs. (6) and (7).

$$C' = \frac{-Z''(\omega)}{\omega |Z(\omega)|^2} \quad (6)$$

$$C'' = \frac{Z'(\omega)}{\omega |Z(\omega)|^2} \quad (7)$$

The slope of the C' curve in the high-frequency domain was calculated as almost zero up to 0.1 Hz. A trend towards saturation of a C' value was observed in the low-frequency domain, indicating the rate of ion diffusion. The real part of the complex capacitance (C') corresponds to the device capacitance measured at DC, and this value is towards to the constant current capacitance value at the lowest frequency point.

Imaginary complex capacitance (C") showed irreversible relaxation processes that caused losses in supercapacitors. The peak seen in the low frequency ($f_0$) of the C" shows point where the transition from resistive to capacitive behavior of the device. Different factors such as redox mediator and the state from gel to solid structure of the electrolyte affected the situation.

Figure 9D:
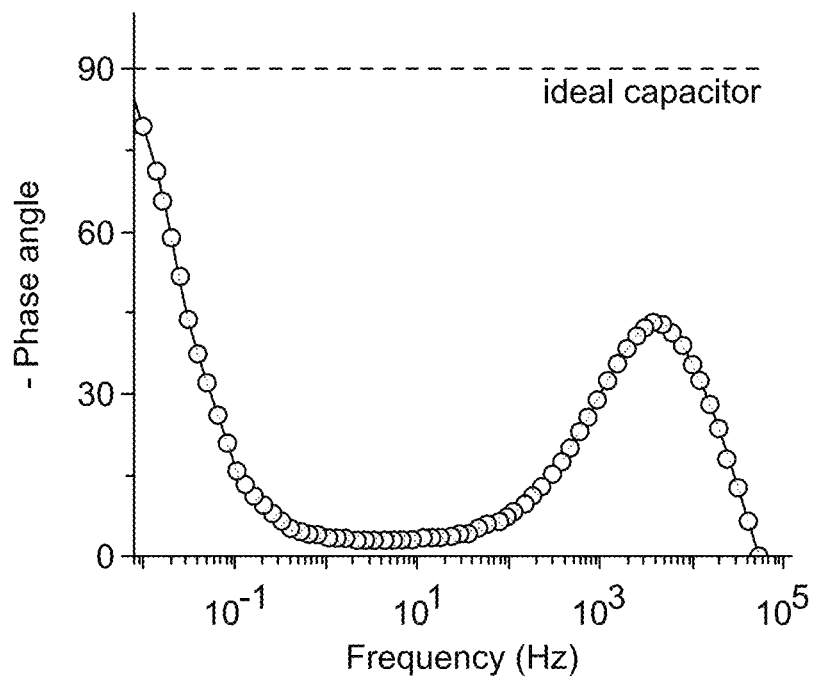
FIG. 9D illustrates a phase angle (degree) of CCAH2 based supercapacitor, according to certain embodiments.

FIG. 9D shows the phase angle (degree) behavior depending on the frequency of CCAH2 based supercapacitor. The dashed line shows the ideal capacitor behavior at the phase angle 90°. The device showed a phase angle of 81.5° in the low-frequency domain, which indicated the device has higher capacitive performance in this region.

Figure 10A:
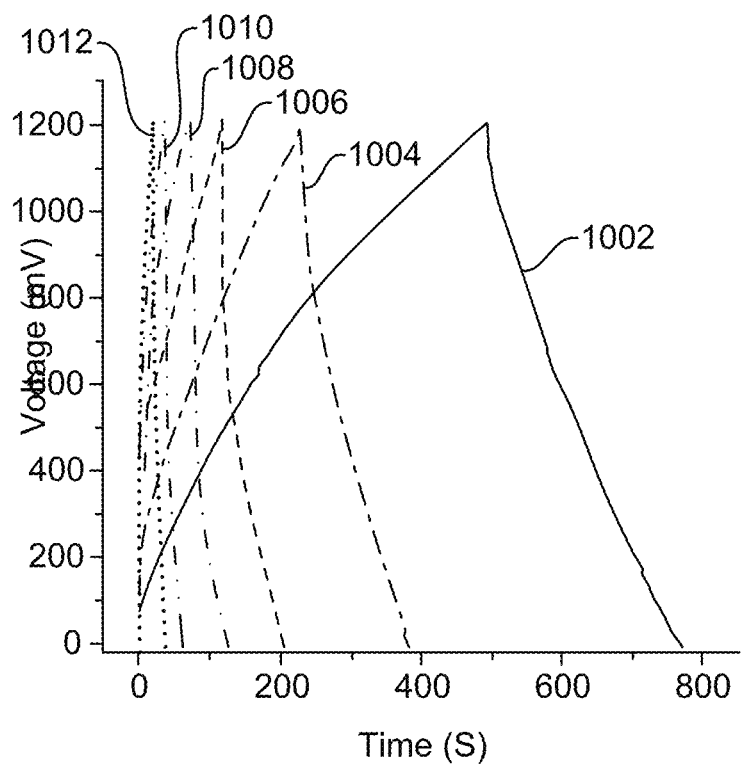
FIG. 10A illustrates galvanostatic charge-discharge (GCD) curves of supercapacitors containing CCAH1.5, according to certain embodiments.
Figure 10B:
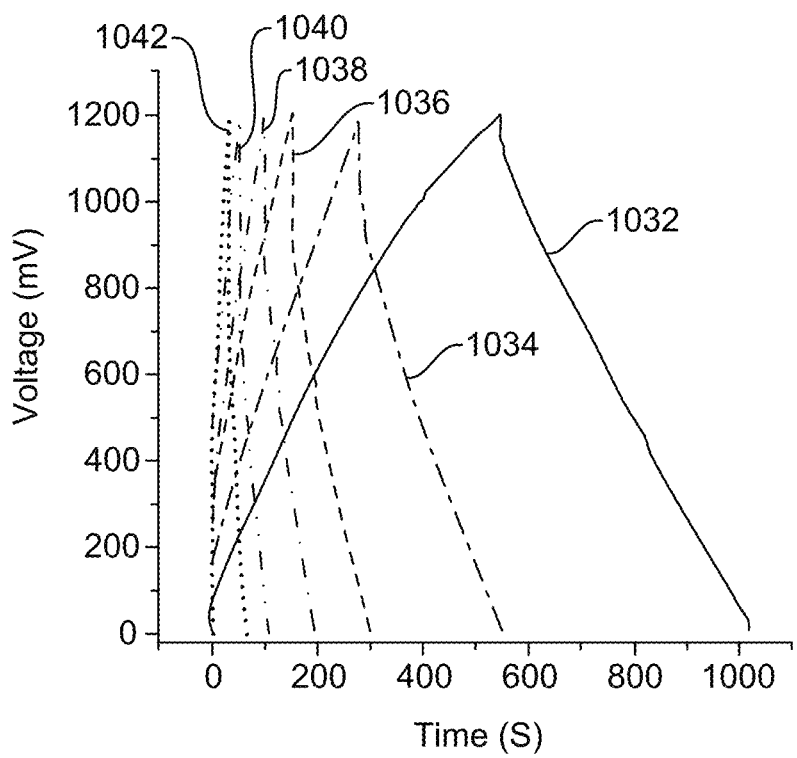
FIG. 10B illustrates GCD curves of supercapacitors containing CCAH2, according to certain embodiments.
Figure 10C:
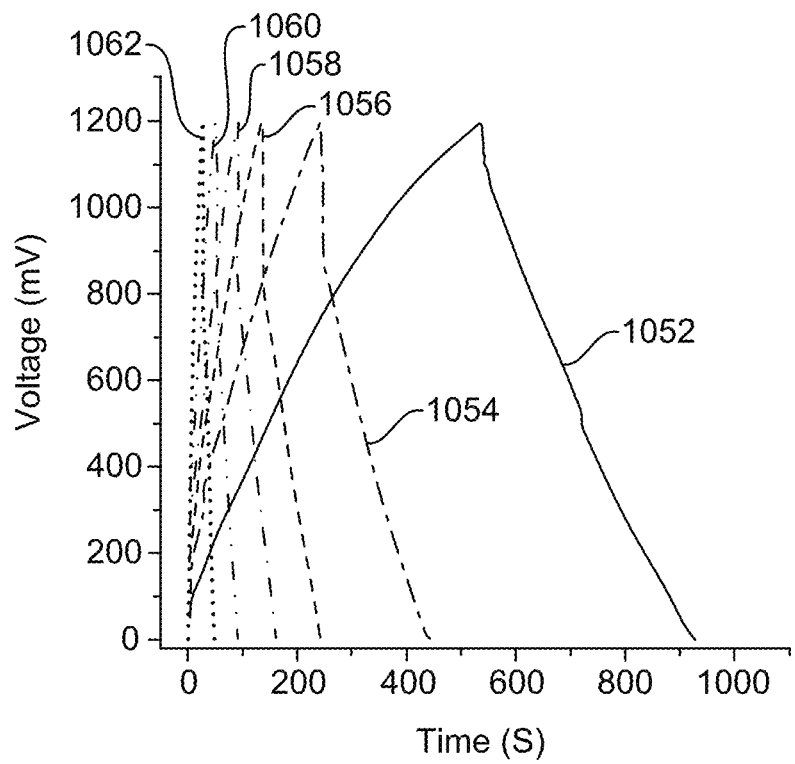
FIG. 10C illustrates GCD curves of supercapacitors containing CCAH3 at different current densities, according to certain embodiments.
Figure 10D:
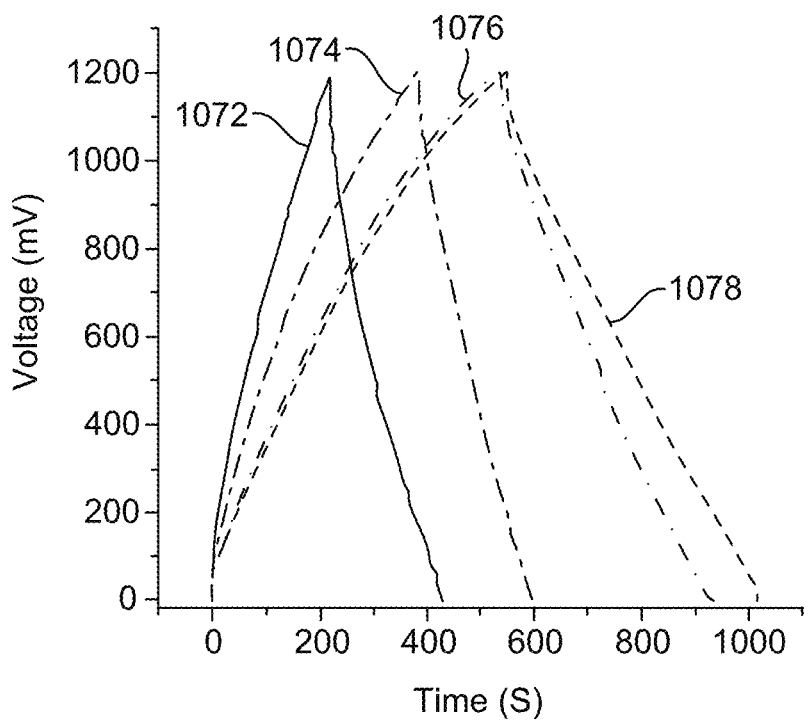
FIG. 10D illustrates GCD curves of supercapacitors containing a comparison of GCD profiles at 0.5 mA current density, according to certain embodiments.

GCD curves of the CCAH1.5, CCAH2, CCAH3, and electrolytes are demonstrated in FIG. 10A-10C, respectively, at different current densities. FIG. 10A shows the plot 0.5 mA 1002, 1.0 mA 1004, 2.0 mA 1006, 3.0 mA 1008, 4.0 mA 1010 and 5.0 mA 1012. FIG. 10B shows the plot 0.5 mA 1032, 1.0 mA 1034, 2.0 mA 1036, 3.0 mA 1038, 4.0 mA 1040 and 5.0 mA 1042. FIG. 10C shows the plot 0.5 mA 1052, 1.0 mA 1054, 2.0 mA 1056, 3.0 mA 1058, 4.0 mA 1060 and 5.0 mA 1062. It was observed that by increasing the current rates, the charge/discharge curves were almost symmetrical indicated excellent coulombic efficiency at different rates. The capacitive behavior was obtained by the electric double layer capacitance formation leading well controlled ion-diffusion from electrolyte to the electrode from 0.5 mA to 5 mA. FIG. 10D displays the GCD profiles of different electrolytes (CCA 1072, CCAH1.5 1074, CCAH2 1076, CCAH3 1078). It was evident that by adding the H to CCA, the discharge time increased. However, the CCAH3 showed decline in the discharge time when the concentration of the H increased, which could be related to the agglomeration of the electrolyte ions.

Figure 10E:
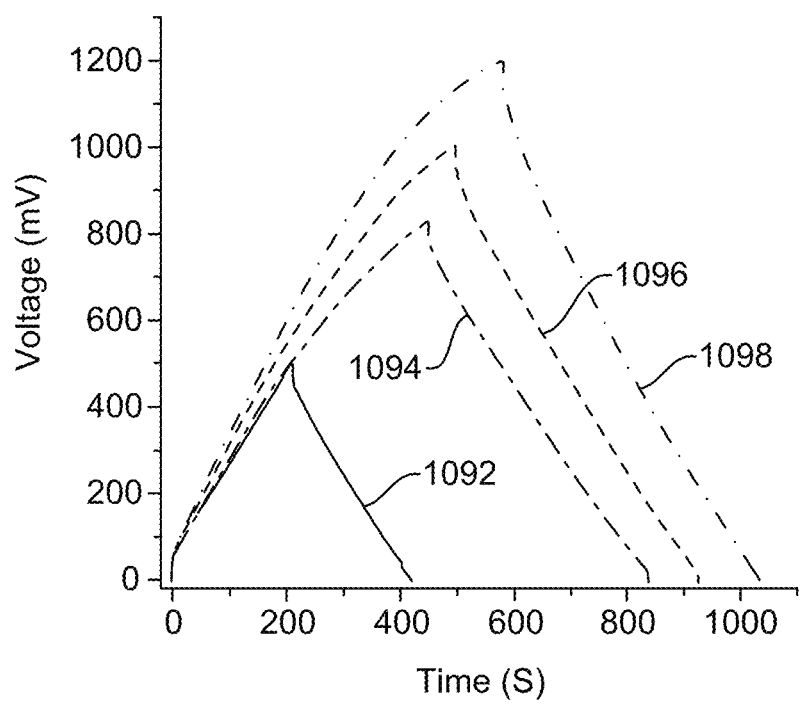
FIG. 10E illustrates GCD curves of supercapacitors containing GCD profiles of CCAH2 at different voltages, according to certain embodiments.
Figure 10F:
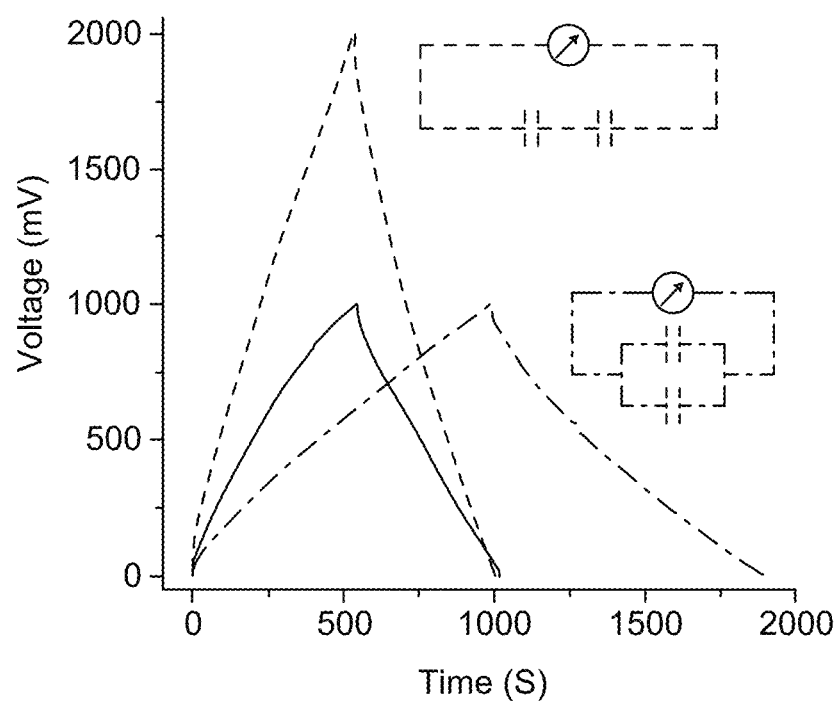
FIG. 10F illustrates GCD curves of supercapacitors containing GCD profiles of CCAH2 based supercapacitors connected in series and parallel, according to certain embodiments.

FIG. 10E illustrates the GCD measurement of CCAH2 was tested at different voltages such as 0.5V 1092, 0.8V 1094, 1.0 V 1096 and 1.2 V 1098 at a constant current of 0.5 mA. It was noted that the electrolyte has a stable window with a domain from 0 to 1.2 V. FIG. 10F shows the GCD curves indicating the assembled CCAH2 devices connected in series and parallel. In series connection, the voltage range of the system is about 2-fold for two cells, compared to a single device at a current density of 0.5 mA. In the parallel conditions, compared to a single cell, the discharge time got doubled for two cells. The new discharged time showed an excellent behavior of scalable energy storage systems for the assembled devices.

Figure 11A:
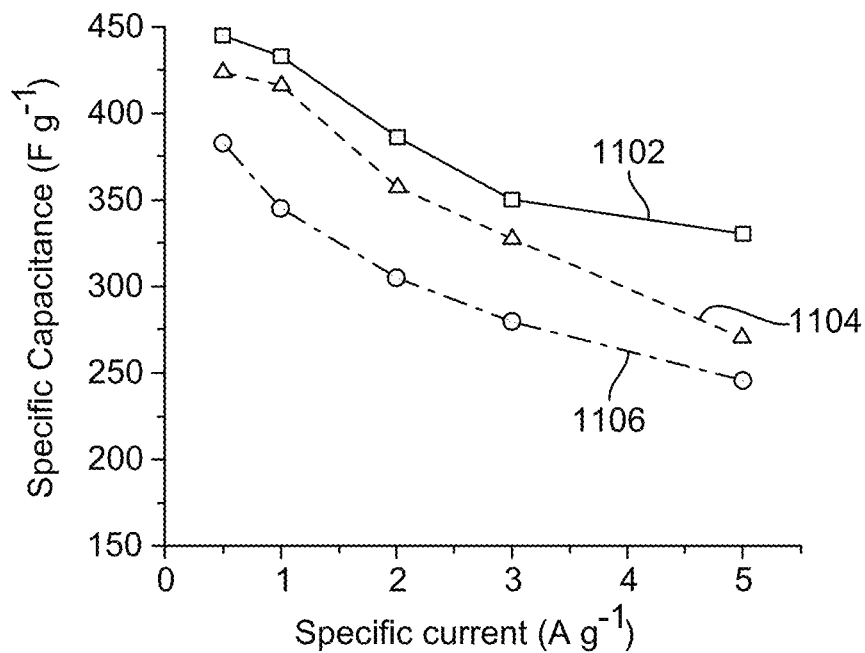
FIG. 11A illustrates the specific capacitance (Cs) of CCAH2, CCAH1.5, and CCAH3 at different current densities, according to certain embodiments.
Figure 11B:
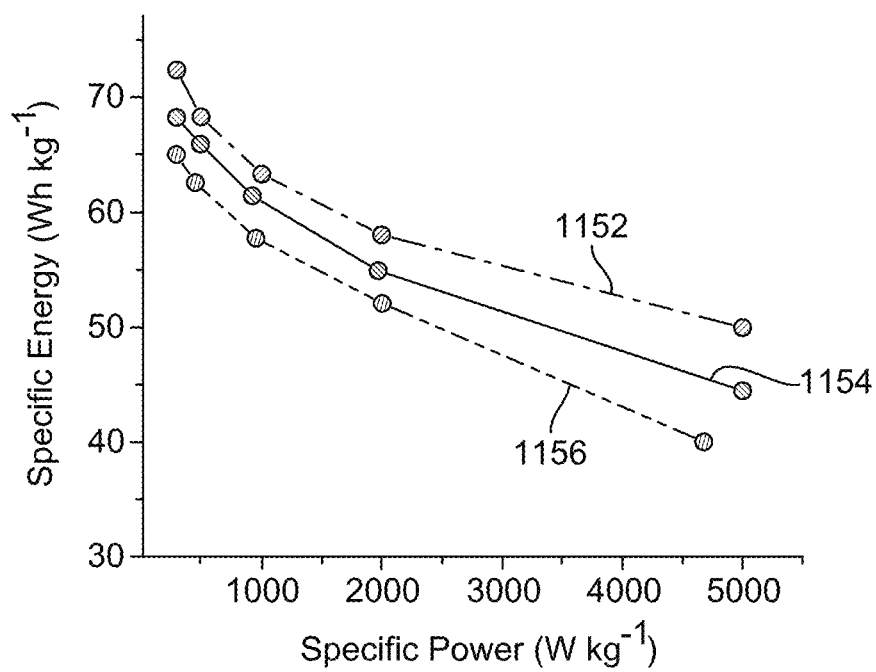
FIG. 11B illustrates a Ragone plot of CCAH2, CCAH1.5, and CCAH3 based supercapacitor devices, according to certain embodiments.
Figure 11C:
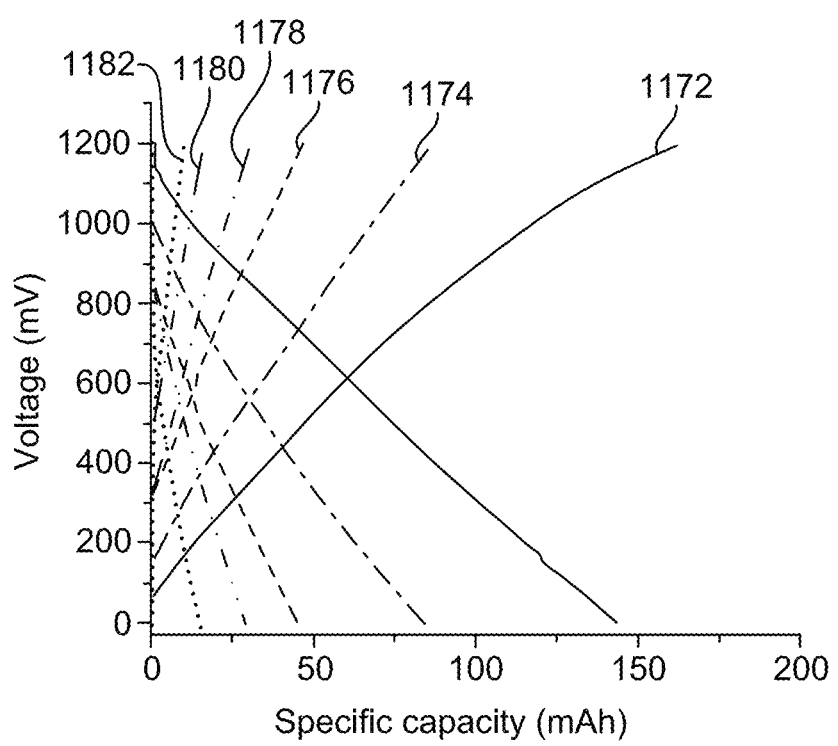
FIG. 11C illustrates a specific capacity of the device containing CCAH2, according to certain embodiments.

FIG. 11A illustrates the relation between Cs and the current density of PHE containing supercapacitor devices. It could be clearly seen that CCAH2 1102 demonstrates the specific capacitance of 441 F g$^{-1}$ at 0.5 A g$^{-1}$ whereas the Cs of CCAH1.5 1104 and CCAH3 1106 provided 331 F g$^{-1}$ and 282 F g$^{-1}$, respectively. CCAH2 1102 containing device demonstrated a rate capability by maintaining 70% of its initial performance when the current increased up to 5 A g$^{-1}$. Energy and power, and density were considered the most important parameters to reveal the performance of energy storage devices. FIG. 11B shows the Ragone plot of the supercapacitors possessing CCAH based electrolytes. It was observed that the supercapacitor with CCAH2 1152 electrolyte exhibits an optimal energy density of 72 Wh kg$^{-1}$ at a power density of 300 W k g$^{-1}$ which indicates the capacitive behavior of CCAH2 1152 is better than other electrolytes (CCAH1.5 1154 and CCAH3 1156). FIG. 11C illustrates the specific capacity of the device containing CCAH2 was calculated at a constant value of charging and discharging current. The highest specific capacity of 144.5 mAh g$^{-1}$ was achieved at a constant current of 0.5 mA 1172. Other current variations were also plotted in the graph such as 1.0 mA 1174, 2.0 mA 1176, 3.0 mA 1178, 4.0 mA 1180, and 5.0 mA 1182. The same device exhibits a reversible specific capacity of 18 mAh g$^{-1}$ at 5 mA with coulombic efficiency above 99.5%.

Figure 11D:
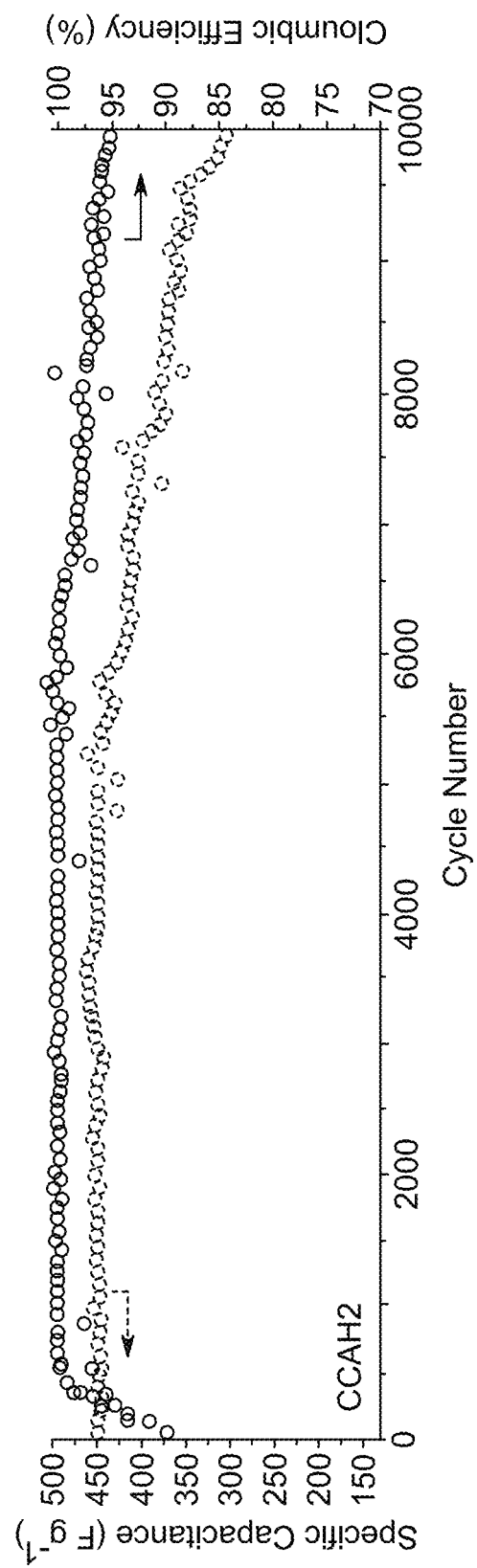
FIG. 11D illustrates a specific capacitance versus cycle number, according to certain embodiments.
Figure 12:
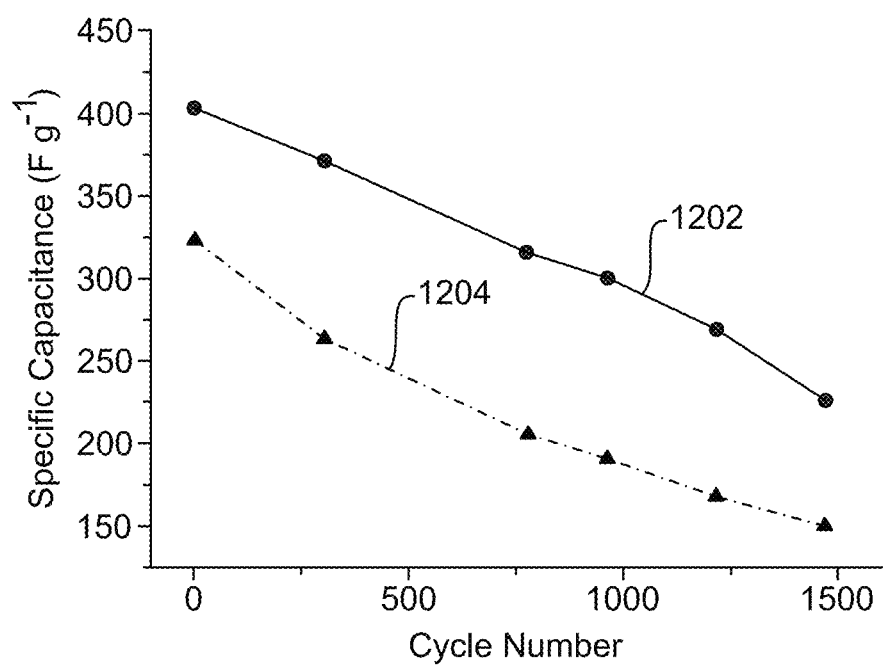
FIG. 12 illustrates a cyclic stability of H2 and CCA based supercapacitors, according to certain embodiments.

FIG. 11D shows Cs (CCAH2) and coulombic efficiency profiles over a 10.000 cycle period, at a current density of 1 mA. Excellent coulombic efficiency was 99.5% was obtained up to 1.000 cycles and it was declined very slowly (96%) when the device reach 10.000 cylces. The Cs of the device (441 F g$^{-1}$) was maintained almost 91% of the initial performance up to 4.000 cycles. FIG. 12 shows the capacitance retention of the H2 1204 and CCA 1202 based supercapacitors. The capacitance retention of the devices drops rapidly and reaches almost neglectable levels. The capacitance loss was also observed in CCAH2 device getting due to ion-diffusion limitations and segmental distortions of the electrode and electrolyte. However, the capacitance retention rate obtained as 57.21% after 10.000 cycles indicate excellent performance as compared to the electrolyte without C.

Figure 13A:
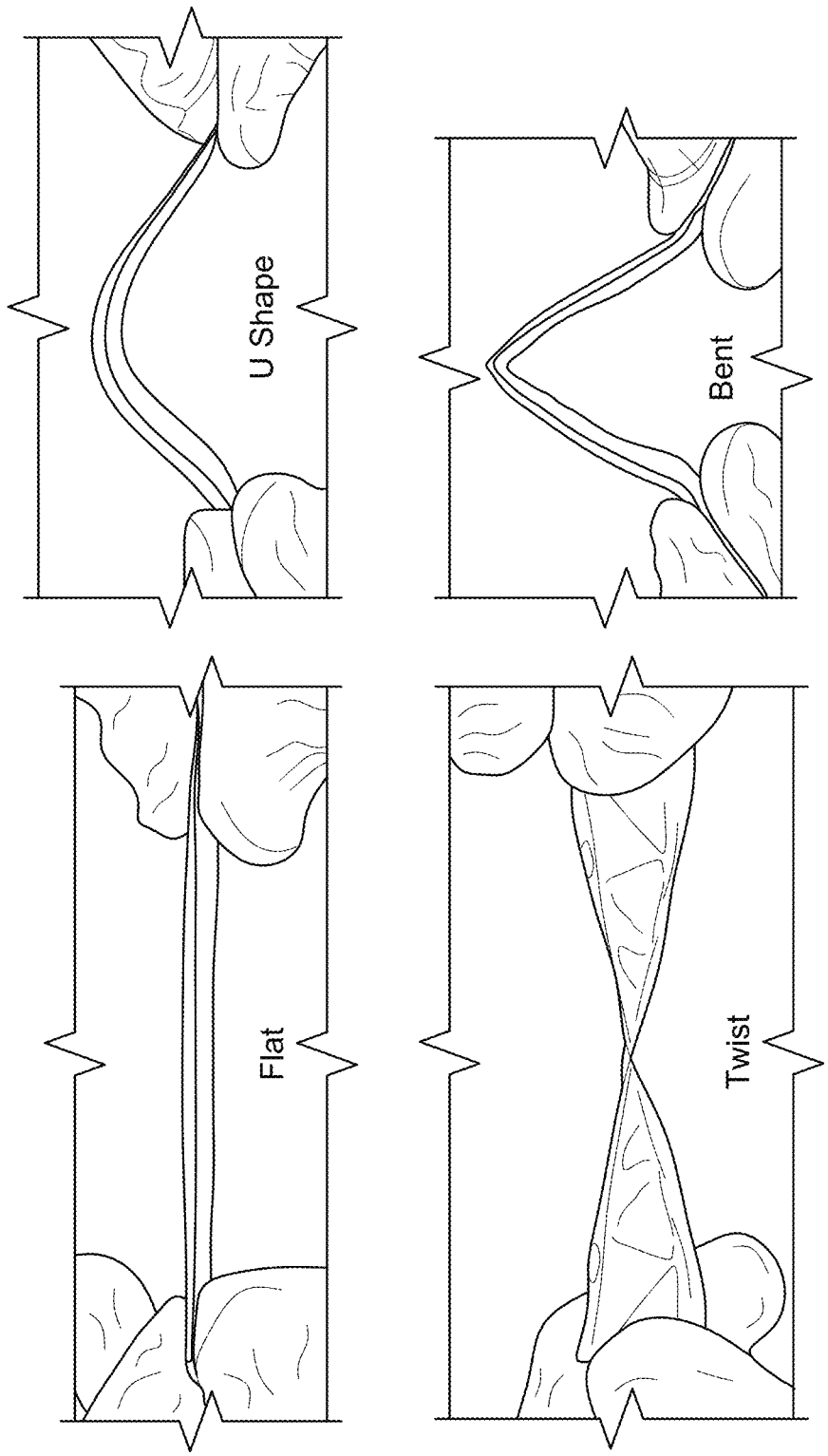
FIG. 13A illustrates flexibility tests of CCAH2 based supercapacitor device, according to certain embodiments.
Figure 13B:
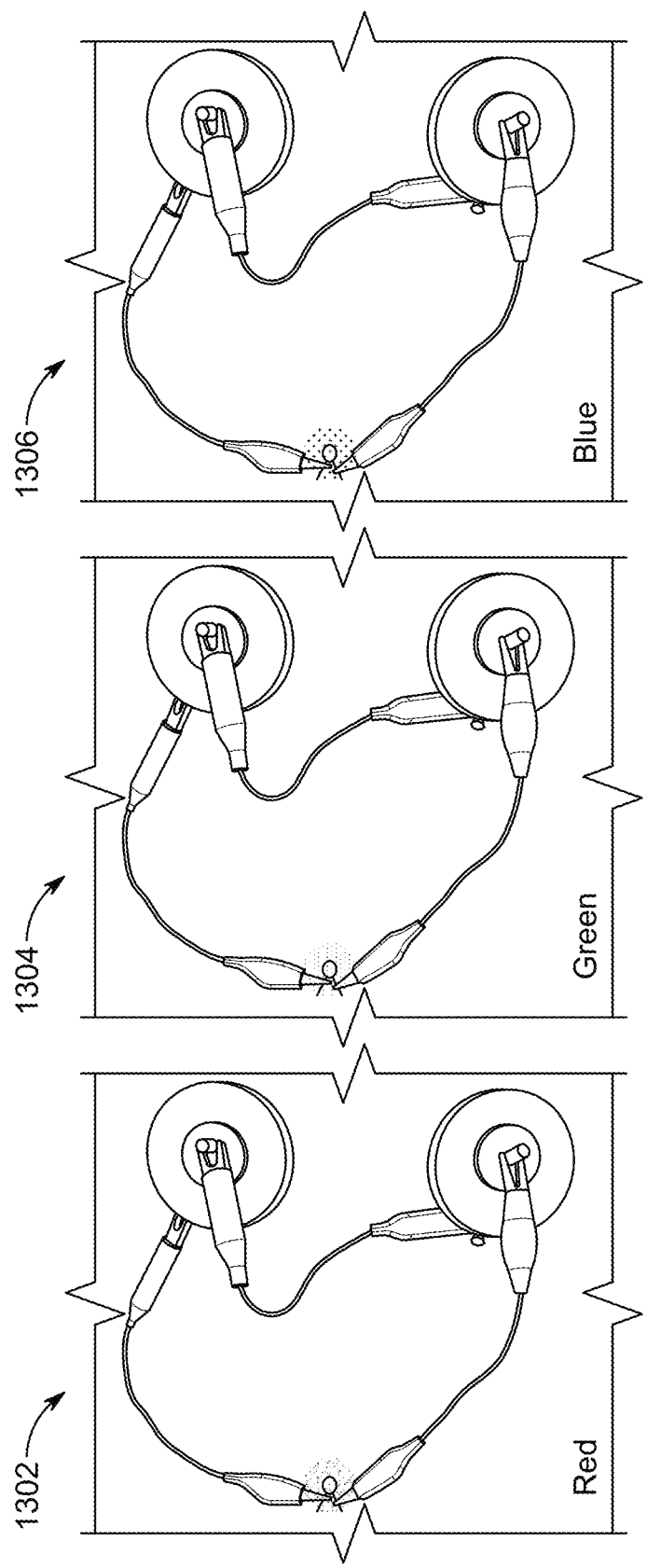
FIG. 13B illustrates an operational performance test of two supercapacitor devices with red green blue (RGB) light-emitting diode (LED) light, according to certain embodiments.
Figure 13C:
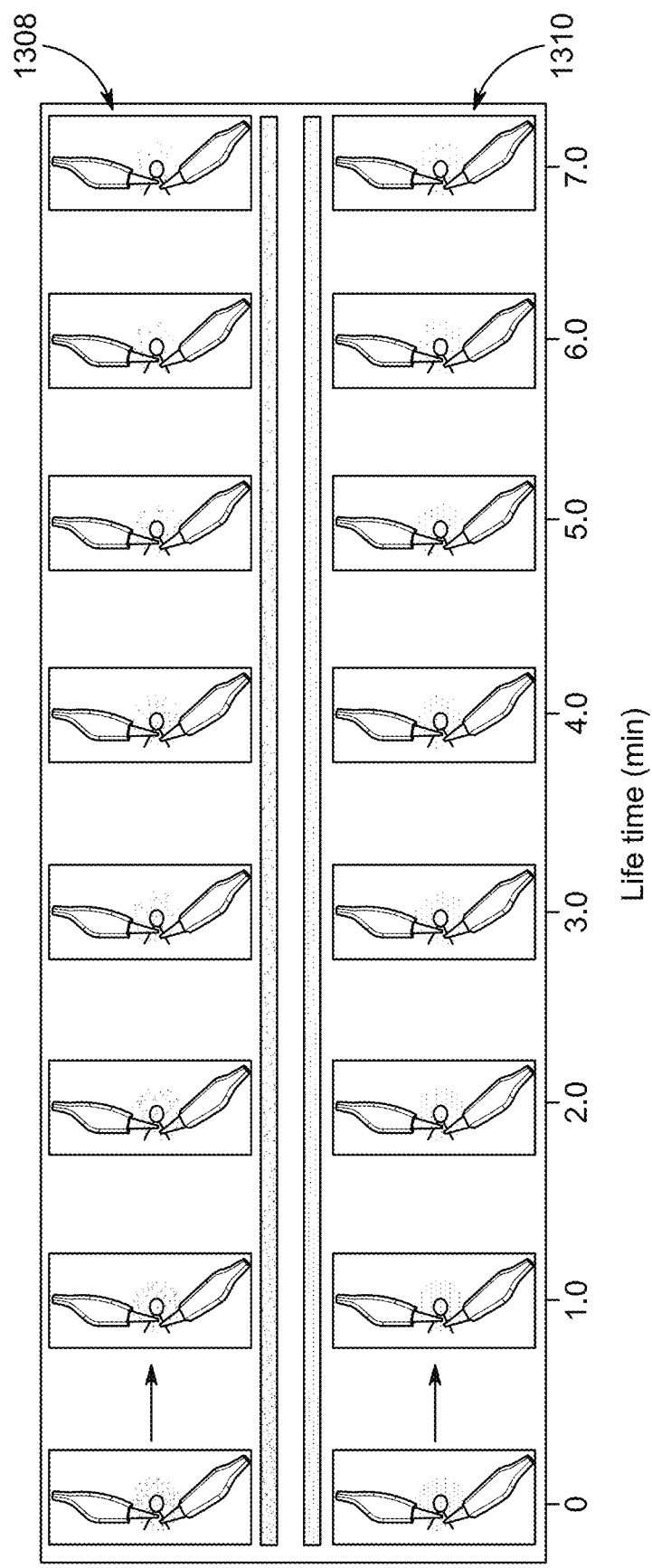
FIG. 13C illustrates an operational lifetime test with different colored LEDs, according to certain embodiments.

Supercapacitor fabricated with a dimension of 2 cm to 5 cm was subjected to different flexibility test. FIG. 13A shows a device in flat, U shape, twist, and bent forms attributed to a superior mechanical property. The operational performance of two series-connected supercapacitor devices was realized after charging up to 2.7 V for 5 min. FIG. 13B illustrates two series-connected devices were successfully operated light-emitting diode. FIG. 13C illustrates lifetime performance tests of two devices with light-emitting diodes (LEDs) of different energy levels 1302, 1304, and 1306. Both identical devices (charged up to 2.7 V for 5 min) were connected to LEDs 1308 and 1310 respectively, and it was seen that the lifetime of the device with high energy level LED (1310) was consumed faster.

A comparison of the electrochemical performance of the CCAH2-based supercapacitors in present work with earlier reported of carbon-based electrodes and bio electrolyte-based supercapacitor systems is given in Table 1. These results showed that the CCAH2-based supercapacitor illustrated excellent electrochemical performance (442 F g$^{-1}$), which was superior to that of the other bio electrolyte-based supercapacitor systems such as carboxylated chitosan hydrogel (45.9 F g$^{-1}$), cellulose Hydrogel (292 F g$^{-1}$), Gly3MKOH (150 F g$^{-1}$) and Ch/poly(EG-ran-PG) 225 F g$^{-1}$ in recent.

conductivity of gel polymer electrolytes (GPE) and electrochemical performance of supercapacitor. HEC increased the interface performance and promoted ion transport at the electrode-electrolyte interface.

The production of sodium carboxy methyl cellulose was reported supporting partially cross-linked bio blends having low concentrations of CA (5%, w w) and H at various fractions. The resultant quasi-solid-state bio-polymer electrolyte resembles the classical hydrogel electrolyte showing higher ionic conductivity, cost-effectivity and non-toxicity. Spectroscopic studies revealed that water-swollen partially cross-linked gels were produced and excessive hydrogen bonding dominated H integration into the material causing better ion conductivity. Flexible devices were assembled, leveraging long cycling stability over 10.000 cycles with high rate capability due to highly efficient and robust contact of electrolyte with the electrodes. The electric double layer capacitor (EDLC) energy storage mechanism was expected to occur over simultaneous faster ion intercalation and deintercalation into the porous carbon electrode yielding a Cs of 442 F g$^{-1}$. The energy density of 72 Wh kg$^{-1}$ was maintained at a power density of 331 W kg$^{-1}$. The strategy to use all bio-based materials could open a feasible route for the development of safer bio-batteries that could be suggested to use in wearable and biomedical systems.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A hydrogel electrolyte for a supercapacitor, comprising:
sodium carboxymethyl cellulose (C);
water;
citric acid (CA); and
an aqueous extract of *Hibiscus sabdariffa*;

TABLE 1

Performance comparison of CCAH2-based supercapacitors with various bio electrolyte-based supercapacitor system

| Electrode Material | Electrolyte Type | Energy Density | Power Density | Capacitance |
|---|---|---|---|---|
| Activated Carbon | CCAH Hydrogel | 72 Wh kg$^{-1}$ | 226.6 Wkg$^{-1}$. | 442 F g$^{-1}$ |
| PCM electrode | Carboxylated chitosan hydrogel | 5.2 Wh kg$^{-1}$, | 226.6 Wkg$^{-1}$. | 45.9 F g$^{-1}$ |
| Activated Carbon | mCel-membrane/KOH | 4.37 Wh kg$^{-1}$ | 249 W kg$^{-1}$ | 110 F g$^{-1}$ |
| (Lig/SWCNT$_{HNO3}$) | Cellulose Hydrogel | 17.1 W h kg$^{-1}$ | 324 W kg$^{-1}$ | 292 F g$^{-1}$ |
| Jute sticks | Gly3MKOH | 20 Whkg$^{-1}$ | 500 Wkg$^{-1}$ | 150 F g$^{-1}$ |
| Carbon | (SPI)(HEC) with 1.0 mol L-1 Li2SO4 | 7.17 Whkg$^{-1}$ | 771.15 Wkg$^{-1}$. | 100.35 F g$^{-1}$ |
| Activated porous carbon | Ch/poly(EG-ran-PG) | 4.7 W h kg$^{-1}$ | 2.5 kW kg$^{-1}$ | 225 F g$^{-1}$ |
| Activated Carbon | MESF | 17 Wh kg$^{-1}$ | 3823 W kg$^{-1}$ | 240 Fg$^{-1}$ |
| Activated Carbon | SPI—Li$_2$SO$_4$—KI | 16.02 W h kg$^{-1}$ | 573.78 W kg$^{-1}$ | 224.19 F g$^{-1}$ |
| Activated carbon | LC-GPE | 0.22 W h kg$^{-1}$ | 2.2 W kg$^{-1}$ | 120 F g$^{-1}$ |
| Activated carbon | (CYCTS-g-PAM-Li2 | 8.7 Wh kg$^{-1}$ | 350.3 W kg$^{-1}$ | 31.89 F g |

There is also a good performance from the systems with Ch/poly(EG-ran-PG) electrolytes.

However, it was reported that the homogeneous porous structure and a large number of active hydroxyl groups lead to the retention of electrolyte and the development of excellent mechanical properties on mCel-membrane, resulting in enhanced ionic conductivity and cycle capacitance stability. The soy protein isolate (SPI) blended with hydroxyethyl cellulose (HEC) then saturated with 1.0 Molar (M) lithium sulfate (Li$_2$SO$_4$) electrolyte improved the ionic wherein the sodium carboxymethyl cellulose (C) and the citric acid (CA) form a citric acid crosslinked cellulose-based polymer hydrogel (C-CA-C); and wherein an organic acid from the aqueous extract of *Hibiscus sabdariffa* is intercalated to the citric acid crosslinked cellulose-based polymer hydrogel (C-CA-C) via hydrogen bonds.

2. The hydrogel electrolyte of claim 1, wherein the organic acid is at least one selected from a group consisting of a phenolic acid, hydroxycitric acid, a *hibiscus* acid, tartaric acid, malic acid, and ascorbic acid.

3. The hydrogel electrolyte of claim 1, wherein the sodium carboxymethyl cellulose and citric acid have a weight ratio of 1:4 to 4:1.

4. The hydrogel electrolyte of claim 1, wherein the hydrogel comprises 50 to 99 wt % of water relative to the total weight of the hydrogel.

5. The hydrogel electrolyte of claim 1, wherein the hydrogel electrolyte has a weight loss of less than 10% when heated to a temperature of up to 200° C. for at least 15 minutes.

6. The hydrogel electrolyte of claim 1, wherein the hydrogel electrolyte has an ion conductivity of 0.005 to 0.05 S cm$^{-1}$ at 20 to 30° C.

7. The hydrogel electrolyte of claim 1, wherein the aqueous extract of *Hibiscus sabdariffa* is made by contacting *Hibiscus sabdariffa* with water at a mass ratio of the *Hibiscus sabdariffa* to water of 1:25 to 1:5.

8. The hydrogel electrolyte of claim 7, wherein the contacting is done for 12 to 96 h at 20 to 30° C.

9. The hydrogel electrolyte of claim 7, wherein *Hibiscus sabdariffa* is ground, blended, or cut.

10. The hydrogel electrolyte of claim 7, wherein the *Hibiscus sabdariffa* is a flower of *Hibiscus sabdariffa*.

11. A method of making the hydrogel electrolyte of claim 1, comprising:
    mixing sodium carboxymethyl cellulose powder and water to form a first mixture;
    mixing citric acid with the first mixture to form a second mixture; and
    mixing the aqueous extract of *Hibiscus sabdariffa* with the second mixture to form the hydrogel electrolyte.

12. A supercapacitor, comprising:
    an anode;
    a cathode; and
    the hydrogel electrolyte of claim 1;
    wherein the anode and the cathode have a surface of a conductive carbonaceous material in contact with the hydrogel electrolyte.

13. The supercapacitor of claim 12, wherein:
    the conductive carbonaceous material is at least one selected from a group consisting of graphite, activated carbon, reduced graphene oxide, carbon nanotubes, carbon nanofibers, and carbon black.

14. The supercapacitor of claim 12, which has a power density of 200 to 500 W/kg.

15. The supercapacitor of claim 12, which has an energy density of 50 to 120 W·h/kg.

16. The supercapacitor of claim 12, wherein at least 90% of the initial specific capacitance is maintained after 90,000 to 12,000 charge-discharge cycles.

17. The supercapacitor of claim 12, which has a specific capacitance of 380 to 500 F/g at 0.2 to 0.8 mA.

18. The supercapacitor of claim 12, which has an equivalent series resistance of 3 to 11 Ohm.

19. A supercapacitor assembly, comprising:
    2 to 10 of the supercapacitors of claim 12 connected in parallel and/or in series.

20. A light-emitting diode device comprising the supercapacitor of claim 12, wherein:
    the supercapacitor is electrically connected to a light-emitting diode; and
    the supercapacitor functions as a battery.

* * * * *